US 8,048,569 B2

United States Patent
Fujikawa et al.

(10) Patent No.: US 8,048,569 B2
(45) Date of Patent: Nov. 1, 2011

(54) NON-AQUEOUS ELECTROLYTE SECONDARY BATTERY

(75) Inventors: Masato Fujikawa, Osaka (JP); Masaya Ugaji, Osaka (JP); Takayuki Shirane, Osaka (JP); Kaoru Inoue, Osaka (JP)

(73) Assignee: Panasonic Corporation, Osaka (JP)

( * ) Notice: Subject to any disclaimer, the term of this patent is extended or adjusted under 35 U.S.C. 154(b) by 932 days.

(21) Appl. No.: 12/030,411

(22) Filed: Feb. 13, 2008

(65) Prior Publication Data

US 2008/0193848 A1    Aug. 14, 2008

(30) Foreign Application Priority Data

Feb. 13, 2007   (JP) ................... 2007-031805

(51) Int. Cl.
*H01M 4/13*   (2010.01)
(52) U.S. Cl. ............. 429/231.95; 429/231.9; 429/218.1; 429/211
(58) Field of Classification Search ............ 429/231.95, 429/231.9, 218.1, 211
See application file for complete search history.

(56) References Cited

FOREIGN PATENT DOCUMENTS

| JP | 2002-083594 | 3/2002 |
|----|-------------|--------|
| JP | 2003-303586 | 10/2003 |
| JP | 2004-127561 | 4/2004 |
| JP | 2005-196970 | 7/2005 |

*Primary Examiner* — Helen O Conley

(74) *Attorney, Agent, or Firm* — McDermott Will & Emery LLP

(57) ABSTRACT

A non-aqueous electrolyte secondary battery comprising a negative electrode having a current collector provided with convex portions and concave portions on both surfaces, a first columnar body formed in a tilting orientation on the convex portion on one of the surfaces of the current collector, and a second columnar body formed in a tilting orientation on the convex portion on the other surface, a positive electrode having a positive electrode current collector provided with a positive electrode mixture layer containing a positive electrode active material capable of reversibly inserting and extracting lithium ions on both surfaces, and a separator interposed between the positive electrode and the negative electrode in a confronting manner, wherein the first columnar body and the second columnar body on the negative electrode are tilted to an orthogonal direction of a winding direction of the current collector.

9 Claims, 17 Drawing Sheets

Discharge

NON-AQUEOUS ELECTROLYTE SECONDARY BATTERY

BACKGROUND OF THE INVENTION

1. Field of the Invention

The present invention relates to a non-aqueous electrolyte secondary battery of a cylindrical configuration, and more specifically to a negative electrode structure of the same.

2. Background Art

With the advancement in recent years of electronic apparatuses for their portability and cordless operation, secondary batteries such as nickel hydrogen batteries and lithium ion batteries gain attention as driving power sources because they are smaller in size, lighter in weight and higher in energy density.

A typical lithium ion secondary battery comprises a positive electrode made of a complex oxide containing lithium, a negative electrode containing a lithium metal, a lithium alloy or a negative electrode active material capable of inserting and extracting lithium ions, and an electrolyte.

There are also some researches reported in recent years on certain elements having the property of inserting lithium ions and theoretical capacity densities exceeding 833 mAh/cm$^3$ in place of carbon materials such as graphite that have been used conventionally as the negative electrode material. Silicon (Si), tin (Sn) and germanium (Ge) having the property of alloying well with lithium, oxides and alloys of these elements are some examples of the elements used for the negative electrode active material having the theoretical capacity density exceeding 833 mAh/cm$^3$. Of these materials, silicon particles and silicon-containing particles such as silicon oxide particles are studied broadly as less expensive alternatives.

Various kinds of lithium ion secondary batteries are proposed currently that use lithium inserting elements as the negative electrode materials. Among them, Japanese Patent Unexamined Publication, No. 2002-83594 (hereafter referred to as "patent document 1") discloses a lithium ion secondary battery having a thin film of lithium inserting alloy deposited on a current collector by such means as the CVD method and sputtering method to form a negative electrode.

When the film-like negative electrode material is used as the one discussed above, however, the lithium inserting element exhibits a large degree of expansion and contraction due to insertion and extraction of the lithium ions. If the negative electrode used contains an active material made of Si, for instance, the negative electrode active material changes to a substance symbolized by $Li_{4.4}Si$ under a state of inserting lithium ions to its maximum level. A ratio of increase in volume of the active material reaches up to 4.12 times when it turns from Si to $Li_{4.4}Si$. This tends to cause separation of the current collector from the negative electrode material, wrinkling and the like of the negative electrode due to weakening of adhesion between the current collector and the negative electrode material over repeated cycles of charging and discharging. It is likely that the separation and wrinkles, if occurred, degrade the charging and discharging cycle characteristics of the secondary battery.

Japanese Patent Unexamined Publication, No. 2003-303586 ("patent document 2") is directed to address the above problem, and it discloses an electrode for secondary battery having a thin film of columnar bodies made of an active material, which are formed discretely with void spaces provided among them on a current collector. Similarly, Japanese Patent Unexamined Publication, No. 2004-127561 ("patent document 3") discloses a secondary battery provided with a thin film of an active material formed selectively into a predetermined pattern with void spaces on a current collector of a negative electrode. It is claimed there that these structures obviate physical contacts among the adjoining columnar bodies by virtue of the void spaces provided even if the columnar bodies expand due to insertion of the lithium ions, and they can hence prevent wrinkles and fractures from being developed in the current collectors Moreover, Japanese Patent Unexamined Publication, No. 2005-196970 ("patent document 4") discloses a method of forming a negative electrode, wherein a current collector is provided with convex portions and concave portions on its surface, and a film-like negative electrode material is formed thereon in a tilting orientation with respect to a plane perpendicular to the main surface of the negative electrode material. It indicates that this structure can distribute stresses produced by expansion and contraction of the negative electrode material due to charges and discharges into directions of both parallel and perpendicular to the main surface of the negative electrode material, thereby preventing wrinkles and damages from being developed. In the secondary batteries shown in the patent documents 2 and 3, however, the thin films of the lithium inserting alloy are formed into either columnar bodies or in a predetermined pattern selectively with void spaces provided among them, and in an upright form in the direction of the normal to the current collector. In addition, a positive electrode active material is positioned in a manner to confront the pillar-shaped thin film as well as the void spaces through which the current collector is exposed. For this reason, the lithium delivered from the positive electrode active material deposits on the exposed current collector while also being inserted in the confronting thin film in the beginning of electrical charge. As a result, the thin film becomes less efficient in extracting the lithium during the electrical discharge. It also allows lithium metal to deposit easily, which can be the primary cause of jeopardizing the safety and decreasing the capacity. These phenomena become more pronounced as the charging and discharging cycle is repeated.

According to the secondary battery disclosed in the patent document 4, on the other hand, the negative electrode having the lithium inserting alloy formed in the tilting orientation increases the surface area confronting the positive electrode active material and also prevents the current collector from being exposed, which can use the lithium effectively and avoid deposition of the lithium metal. In other words, the secondary battery of the patent document 4 comprises negative electrode 100 having pillar-shaped negative electrode materials 150 and 160 formed in the tilting orientation on top of convex portions 130 on current collector 110, as shown in FIG. 16A to FIG. 16C, and a cylindrical secondary battery is produced by winding an electrode group formed of laminated negative electrode 100, a separator (not shown in the figures) and a positive electrode (not shown). Negative electrode materials 160 are formed in the upright orientation along a width direction of current collector 110, which is orthogonal to the winding direction, but in the tilting orientation in the winding direction, as shown in FIG. 16B and FIG. 16C. However, current collector 110 having a width W in a fully discharged state expands to an extent of δw in the width direction due to increase in volumes of negative electrode materials 150 and 160 as a result of inserting lithium ions when being charged, which causes the adjoining negative electrode materials 150 and 160 to come in contact with and push against one another, as shown in a diagrammatic illustration of FIG. 17. It is for this reason that the width of current collector 110 as well as the other relevant dimensions need to be reduced in order to make it fit into a battery case, in consideration beforehand of the dimensional changes. This gives rise to a problem that a space inside the battery case cannot be used effectively, thereby limiting improvement of the battery capacity. If any such consideration is not given to the dimensional changes, on the contrary, current collector 110 comes into abutment against insulation plates provided on the top and the bottom of the electrode group inside the battery case due to its expansion, and results in buckling or the like deformation of current collector 110. As a result, a large stress is developed in the junctions between current collector 110 and negative electrode materials 150 and 160, thereby giving rise to another problem that negative electrode materials 150 and 160 separate from current collector 110. Or, there still is a possibility that the current collector wrinkles or deforms even if negative electrode materials 150 and 160 stay not separated. There are cases as a consequence that the cycle characteristics and reliability became impaired.

SUMMARY OF THE INVENTION

A non-aqueous electrolyte secondary battery of the present invention comprises at least a negative electrode having a current collector provided with the convex portions and concave portions on both surfaces thereof, a first columnar body formed in a tilting orientation on the convex portion on one of the surfaces of the current collector, and a second columnar body formed in a tilting orientation on the convex portion on the other surface of the current collector, a positive electrode having a positive electrode current collector provided on both surfaces thereof with a positive electrode mixture layer containing a positive electrode active material capable of inserting and extracting lithium ions reversibly, and a separator interposed between the positive electrode and the negative electrode in a confronting manner, wherein the first columnar body and the second columnar body on the negative electrode are tilted to a direction orthogonal to a winding direction of the current collector.

This structure can alleviate expansion of the current collector in the width direction. The invention can thus improve a capacity of the battery as a result of increasing a surface area of the electrode confronting the positive electrode mixture layer because a width of the current collector can be increased to nearly equal to an effective height of a battery case. In addition, the invention also achieves the non-aqueous electrolyte secondary battery of high reliability including an improved cycle characteristics since it is unlikely to develop wrinkles and fractures in the current collector during charging and discharging cycles.

DETAILED DESCRIPTION OF THE INVENTION

Description is provided hereinafter of certain exemplary embodiments of the present invention with reference to the accompanying drawings. It should be understood, however, that the following description is not to be taken in a limited sense, but the invention may be embodied or practiced in still many other ways as long as they conform to the essential character described in this specification.

First Exemplary Embodiment

Figure 1:
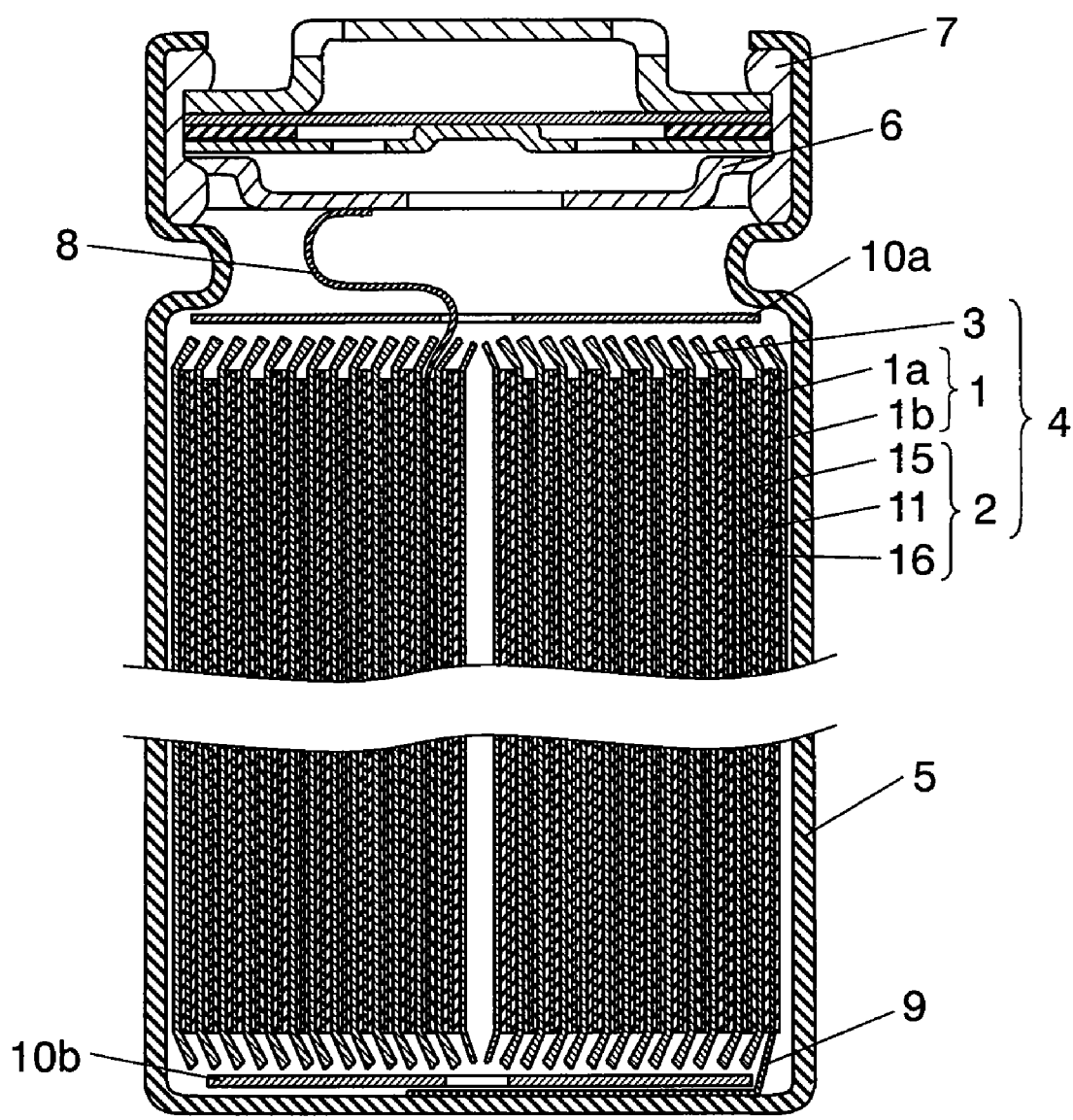
FIG. 1 is a sectional view of a non-aqueous electrolyte secondary battery according to a first exemplary embodiment of the present invention.
Figure 2:
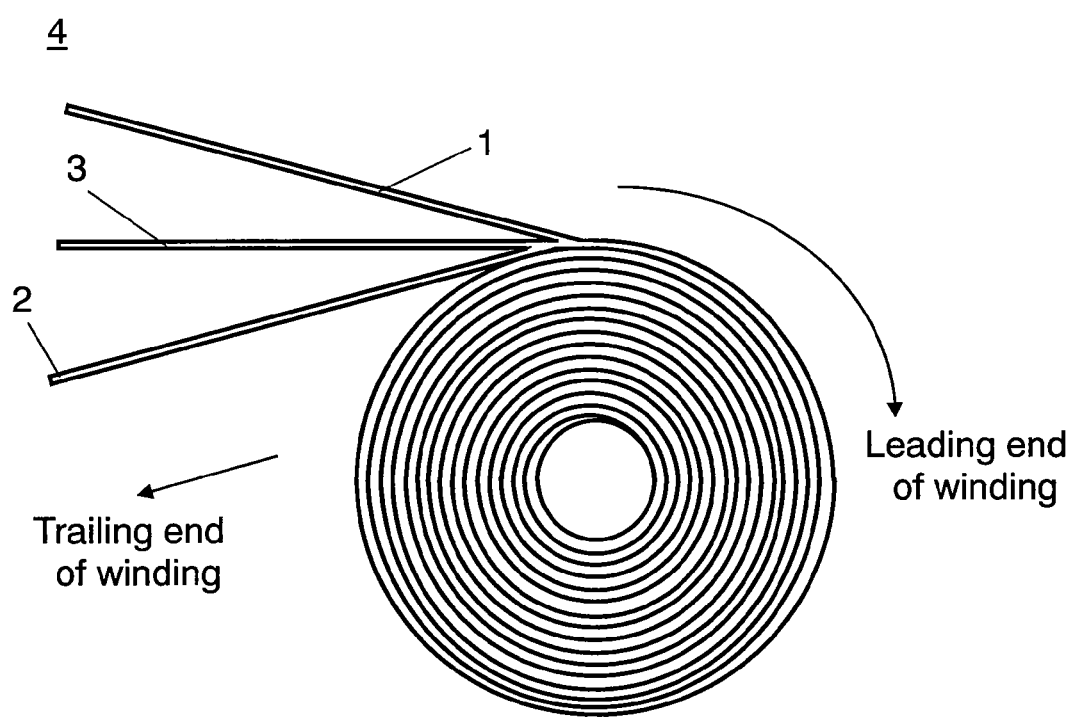
FIG. 2 is a plan view showing schematically a process of winding an electrode group of the non-aqueous electrolyte secondary battery according to the first exemplary embodiment of the invention.
Figure 3A:
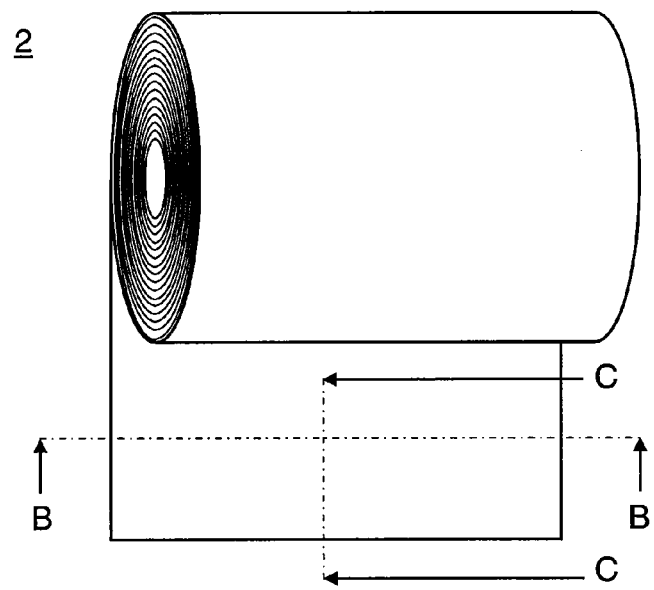
FIG. 3A is a perspective view showing schematically a winding state of only a negative electrode within the electrode group of the non-aqueous electrolyte secondary battery according to the first exemplary embodiment of the invention.

FIG. 1 is a sectional view of a non-aqueous electrolyte secondary battery according to the first exemplary embodiment of the present invention. FIG. 2 is a plan view showing schematically a process of winding an electrode group of the non-aqueous electrolyte secondary battery according to the first exemplary embodiment of this invention. FIG. 3A is a perspective view showing schematically a winding state of only a negative electrode within the electrode group of the non-aqueous electrolyte secondary battery of the first exemplary embodiment of this invention, FIG. 3B is a sectional view taken along the line B-B of FIG. 3A, and FIG. 3C is a sectional view taken along the line C-C of FIG. 3A.

As shown in FIG. 1, the non-aqueous electrolyte secondary battery of a cylindrical configuration (may be referred to hereinafter as "battery") has electrode group 4 comprising positive electrode 1 made of aluminum, for instance, and provided with positive electrode lead 8, and negative electrode 2 made of copper, for instance, provided with negative electrode lead 9 at one end and disposed in a manner to confront positive electrode 1, wherein positive electrode 1 and negative electrode 2 are wound with separator 3 interposed therebetween, as shown in FIG. 2. Electrode group 4 is inserted into battery case 5 with insulation plates 10a and 10b attached to the top and bottom of it, one end of positive electrode lead 8 is welded to sealing plate 6, and one end of negative electrode lead 9 is welded to the bottom portion of battery case 5. In addition, a non-aqueous electrolyte (not shown in the figure) capable of conducting lithium ions is injected in battery case 5, and an open end of battery case 5 is crimped to sealing plate 6 with gasket 7 placed between them. Positive electrode 1 is composed of positive electrode current collector 1a and positive electrode mixture layer 1b containing a positive electrode active material.

Figure 3B:
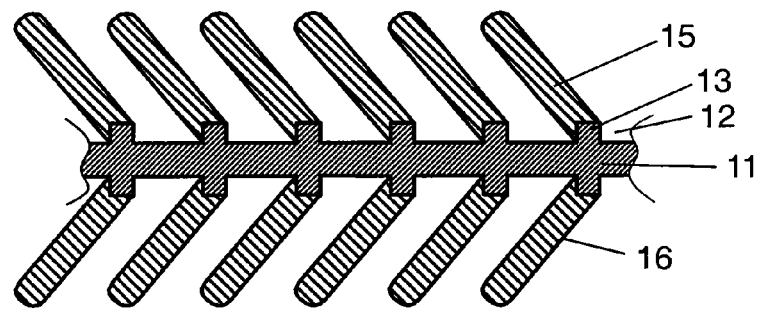
FIG. 3B is a sectional view taken along the line B-B of FIG. 3A.
Figure 3C:
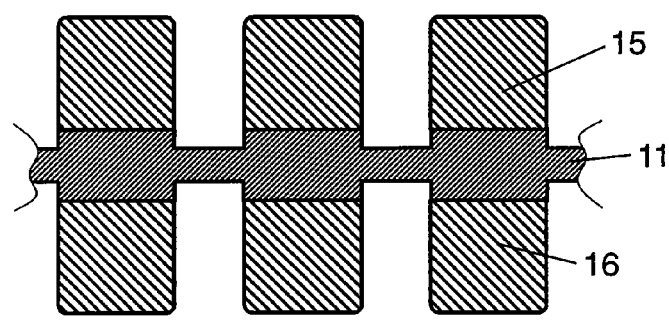
FIG. 3C is a sectional view taken along the line C-C of FIG. 3A.

Negative electrode 2 is composed of negative electrode current collector 11 (hereinafter referred to as "current collector") having concave portions 12 and convex portions 13, first columnar bodies 15 made of an active material such as one symbolized by SiOx for instance, which are provided discretely in a tilting orientation on convex portions 13 on one of the surfaces of current collector 11, and second columnar bodies 16 made of an active material such as that symbolized by SiOx for instance, which are also provided discretely on convex portions 13 of the other surface of current collector 11 in a tilting manner, as shown in FIG. 3B. In this structure, first columnar bodies 15 and second columnar bodies 16 are formed in a manner to tilt to a direction orthogonal to a winding direction ("width direction") of electrode group 4 composed of positive electrode 1, negative electrode 2 and separator 3, which are wound together, as shown in FIG. 3B. In addition, first columnar bodies 15 and second columnar bodies 16 are arranged symmetrically with respect to current collector 11. Moreover, first columnar bodies 15 and second columnar bodies 16 are so formed that they are generally in parallel with each other along the winding direction of current collector 11 as shown in FIG. 3C.

Here, positive electrode mixture layer 1b includes a lithium-containing complex oxide such as $LiCoO_2$, $LiNiO_2$, $LiMn_2O_4$, or a mixture or a composite compound of these materials as the positive electrode active material. Other materials such as olivine type lithium phosphate expressed by the general formula of $LiMPO_4$ (M represents V, Fe, Ni or Mn) and lithium fluorophosphate expressed by the general formula of $Li_2MPO_4F$ (M represents V, Fe, Ni or Mn) can also be used as the positive electrode active material besides those listed above. In addition, a part of these lithium-containing compounds may be substituted with another element of different kind. The surfaces may be treated with a metallic oxide, a lithium oxide or an electrically conductive agent, or a hydrophobic treatment may also be given.

Positive electrode mixture layer 1b further contains an electrical conductive agent and a binder. The electrical conductive material can be any material selected from the group consisting of graphites such as natural graphite and artificial graphite, carbon blacks such as acetylene black, ketjen black, channel black, furnace black, lampblack and thermal black, conductive fibers such as carbon fiber and metallic fiber, metal powders such as fluorocarbon and aluminum, conductive whiskers such as zinc oxide and potassium titanate, conductive metal oxides such as titanium oxide, and organic conductive materials such as phenylene derivative.

Materials used as the binder can be any selected from the group consisting of, for example, PVDF, poly-tetrafluoroethylene, polyethylene, polypropylene, aramid resin, polyamide, polyimide, polyamide-imide, polyacrylo-nitrile, polyacrylic acid, polymethyl acrylate ester, polyethyl acrylate ester, polyhexyl acrylate ester, polymethacrylic acid, polymethyl methacrylate ester, polyethyl methacrylate ester, polyhexyl methacrylate ester, polyvinyl acetate, polyvinyl pyrrolidone, polyether, polyvinyl sulfone, hexafluoro polypropylene, styrene-butadiene rubber and carboxymethyl cellulose. Alternatively, a copolymer may be used such as one made of two or more materials selected from the group consisting of tetrafluoro-ethylene, hexafluoro-ethylene, hexafluoro-propylene, perfluoro-alkyl vinyl ether, vinylidene fluoride, chloro-trifluoro ethylene, ethylene, propylene, penta-fluoro propylene, fluoromethyl vinyl ether, acrylic acid and hexadiene. Or, two or more materials selected from the above group can be used by mixing them.

Materials such as aluminum (Al), carbon and a conductive resin are suitable for positive electrode current collector 1a used for positive electrode 1. Any of these materials may be provided additionally with a surface treatment using carbon or the like materials.

Materials applicable to the non-aqueous electrolyte include an electrolytic solution having a solute dissolve in an organic solvent and a so-called poly-electrolyte layer containing electrolytic solution, which is non-fluidized by a polymer. When an electrolytic solution is used, it is desirable to provide at least separator 3 between positive electrode 1 and negative electrode 2 so that separator 3 is impregnated with the electrolytic solution. Separator 3 may consist of one or more layers of unwoven cloth or micro-porous film made of polyethylene, polypropylene, aramid resin, amide-imide, polyphenylene sulfide, polyimide, and the like. In addition, separator 3 may be provided internally or on its surface with a heat-resistant filler such as alumina, magnesia, silica, titania, and the like. It is also appropriate, besides separator 3, to provide a heat-resistant layer composed of any of these heat-resistant fillers and a binder similar to that used for positive electrode 1 and negative electrode 2.

The non-aqueous electrolyte material is selected based on oxidation-reduction potentials and other properties of the individual active materials. The solute desirable for used in the non-aqueous electrolyte is any of salts as generally used for the lithium batteries such as $LiPF_6$, $LiBF_4$, $LiClO_4$, $LiAlCl_4$, $LiSbF_6$, $LiSCN$, $LiCF_3SO_3$, $LiNCF_3CO_2$, $LiAsF_6$, $LiB_{10}Cl_{10}$, low-grade aliphatic lithium carboxylate, $LiF$, $LiCl$, $LiBr$, $LiI$, borates such as chloroborane lithium, bis-(1,2-benzene dioleate (2-)—O,O') lithium borate, bis-(2,3-naphthalene dioleate (2-)—O,O') lithium borate, bis-(2,2'-biphenyl dioleate (2-)—O,O') lithium borate, bis-(5-fluoro-2-olate-1-benzene-sulfonic acid—O,O') lithium borate, or $(CF_3SO_2)_2NLi$, $LiN(CF_3SO_2)(C_4F_9SO_2)$, $(C_2F_5SO_2)_2NLi$ and lithium tetraphenyl borate.

Furthermore, the organic solvent suitable for dissolving the above salts can be any of the solvents as generally used for the lithium batteries such as one or a mixture of two or more materials selected from the group consisting of ethylene carbonate (EC), propylene carbonate, butylene carbonate, vinylene carbonate, dimethyl carbonate (DMC), diethyl carbonate, ethylmethyl carbonate (EMC), dipropyl carbonate, methyl formate, methyl acetate, methyl propionate, ethyl propionate, dimethoxy methane, γ-butyrolactone, γ-valerolactone, 1,2-diethoxy ethane, 1,2-dimethoxy ethane, ethoxymethoxy ethane, trimethoxy methane, tetrahydrofuran derivatives such as tetra-hydrofuran and 2-methyl-tetrahydrofuran, dirmethyl sulfoxide, dioxolane derivatives such as 1,3-dioxolane and 4-methyl-1,3-dioxolane, formamide, acetamide, dimethyl formamide, acetonitrile, propyl nitrile, nitromethane, ethyl monoglyme, phosphotriester, acetate ester, propionate ester, sulfolane, 3-methyl sulfolane, 1,3-dimethyl-2-imidazolidinone, 3-methyl-2-oxazolidinone, propylene carbonate derivative, ethyl ether, diethyl ether, 1,3-propane sultone, anisole, fluorobenzene, and the like.

The solvent may also contain additives such as vinylene carbonate, cyclohexyl benzene, biphenyl, diphenyl ether, vinyl ethylene carbonate, divinyl ethylene carbonate, phenyl-ethylene carbonate, diallyl carbonate, fluoro-ethylene carbonate, catechol carbonate, vinyl acetate, ethylene sulfite, propane sultone, trifluoro propylene carbonate, dibenzofuran, 2,4-difluoro anisole, o-terphenyl, m-terphenyl, and the like.

A solid electrolyte may be used as the non-aqueous electrolyte by mixing any of the above solutes with one or a mixture of two or more polymeric materials selected from the group consisting of polyethylene oxide, polypropylene oxide, poly-phosphazene, polyaziridine, polyethylene sulfide, polyvinyl alcohol, poly-vinylidene fluoride, polyhexa-fluoropropylene, and the like. Or, the non-aqueous electrolyte can be in a gel form by mixing the solute with the above organic solvent. Moreover, inorganic materials may be used as a solid electrolyte, such as lithium nitride, lithium halogenide, lithium oxoate, $LiSiO_4$, $LiSiO_4$—$LiI$—$LiOH$, $Li_3PO_4$—$Li_4SiO_4$, $Li_2SiS_3$, $Li_3PO_4$—$Li_2S$—$SiS_2$, phosphorus sulfide compound, and the like. When the non-aqueous electrolyte of gel form is used, it can be disposed between positive electrode 1 and negative electrode 2 in place of the separator. Or, the non-aqueous electrolyte of the gel form may be disposed in a manner to adjoin separator 3.

Current collector 11 of negative electrode 2 can be made of such a material as a metal foil of stainless steel, nickel, copper or titanium, or a thin film of carbon or conductive resin. In addition, it may be provided further with a surface treatment with carbon, nickel, titanium or the like material.

Columnar body portions that compose the individual columnar bodies of negative electrode 2 can be formed by using an active material having the property of reversibly inserting and extracting lithium ions and a theoretical capacity density exceeding 833 $mAh/cm^3$, such as silicon (Si) and tin (Sn). Any active material of the above kinds can demonstrate the advantageous effects of the present invention irrespective of whether it is a pure metal, an alloy, a compound, a solid solution, or a complex active material having a silicon-containing material or a tin-containing material. In other words, the silicon-containing material suitable for use can be any of Si, $SiOx$ ($0<x\leq2.0$), or an alloy, a compound or a solid solution of one such material having a part of Si component substituted with at least one element selected from the group consisting of Al, In, Cd, Bi, Sb, B, Mg, Ni, Ti, Mo, Co, Ca, Cr, Cu, Fe, Mn, Nb, Ta, V, W, Zn, C, N and Sn. Some of the tin-containing materials applicable are $Ni_2Sn_4$, $Mg_2Sn$, $SnOx$ ($0\leq x<2.0$), $SnO_2$, $SnSiO_3$ and $LiSnO$.

Any of these materials can be used individually, or a plurality of them may be combined to compose the negative electrode active material. A compound containing Si, oxygen and nitrogen, and a composite material composed of a plurality of compounds, all containing Si and oxygen but of different component ratios, are few examples of composing the negative electrode active material with a plurality of different materials listed above.

Figure 4A:
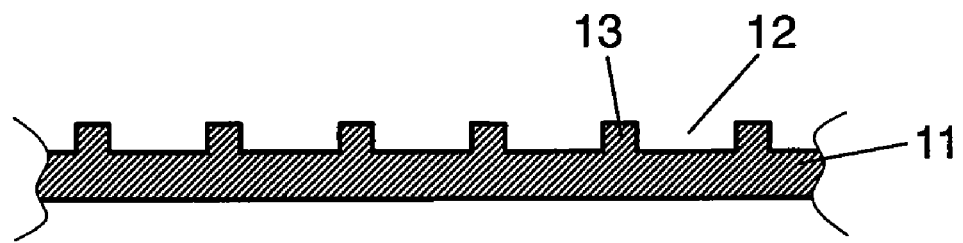
FIG. 4A is a partially sectioned schematic view of the negative electrode of the non-aqueous electrolyte secondary battery, illustrating a process of forming columnar bodies according to the first exemplary embodiment of the invention.
Figure 4B:
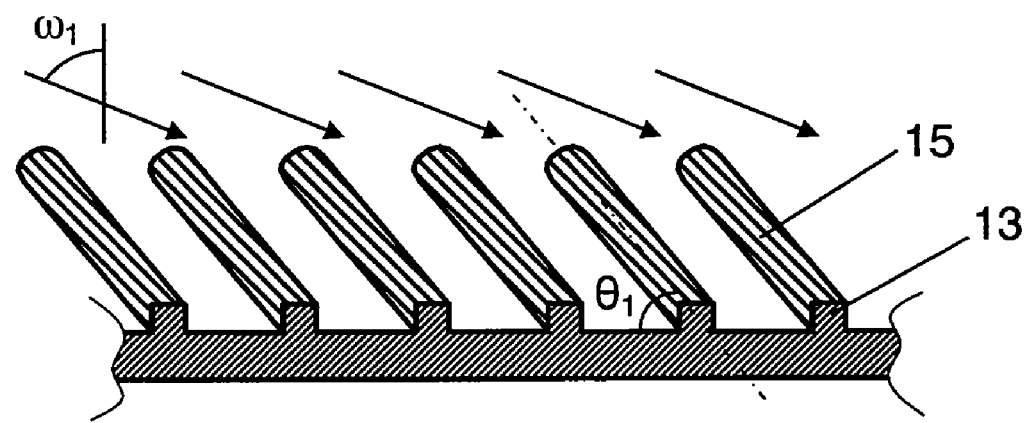
FIG. 4B is a partially sectioned schematic view of the negative electrode of the non-aqueous electrolyte secondary battery, illustrating the process of forming columnar bodies according to the first exemplary embodiment of the invention.
Figure 5:
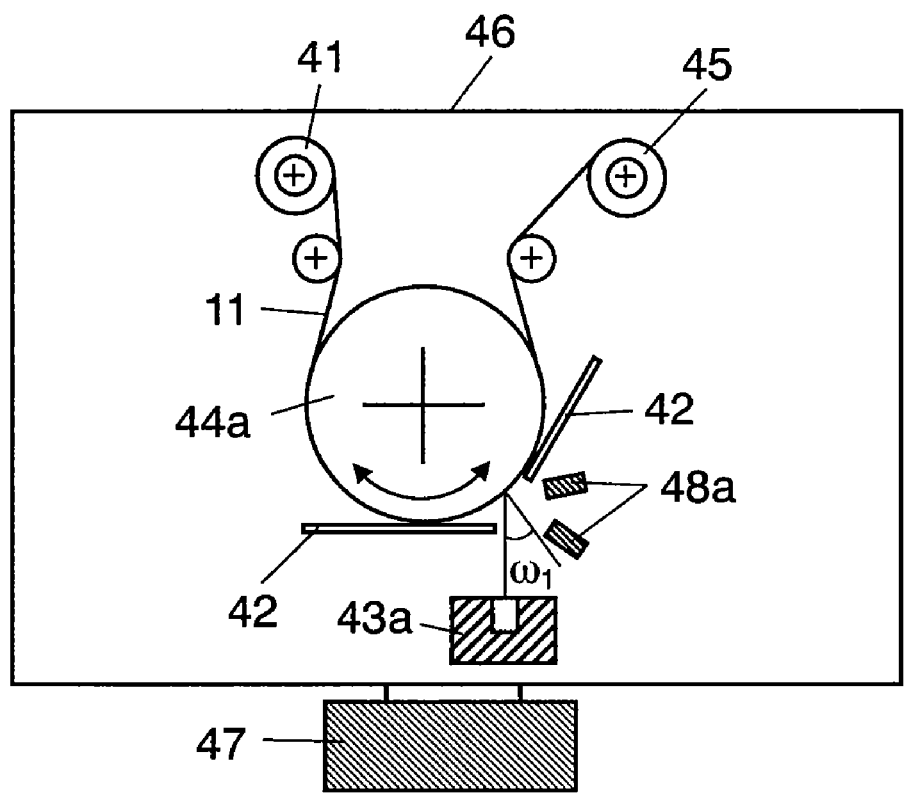
FIG. 5 is a schematic drawing illustrating a manufacturing apparatus used to form the columnar bodies on the negative electrode of the non-aqueous electrolyte secondary battery according to the first exemplary embodiment of the invention.

According to this exemplary embodiment as discussed above, there is an advantage of preventing the current collector from expanding in the width direction by virtue of providing the first columnar bodies and the second columnar bodies discretely in the tilting manner along the width direction of the current collector. This structure can thus prevent the current collector from coming into abutment against the insulation plates and the sealing plate inside the battery case, and causing it to buckle or deform due to expansion of the individual columnar bodies. Accordingly, the structure can improve a capacity of the battery as a consequence of increasing the surface area of the electrode confronting the positive electrode mixture layer since the width of the current collector can be extended to nearly equal to an effective height of the battery case. In addition, the structure can achieve high reliability of the non-aqueous electrolyte secondary battery such as cycle characteristics, since it alleviates stresses on the junctions between the individual columnar bodies and the current collector so as to make the current collector not likely to develop wrinkles and fractures during charging and discharging cycles. Referring now to FIG. 4A, FIG. 4B and FIG. 5, description is provided hereinafter of a method of manufacturing the columnar bodies on the negative electrode of the non-aqueous electrolyte secondary battery according to the first exemplary embodiment of this invention. FIG. 4A and FIG. 4B are partially sectioned schematic views of the negative electrode of the non-aqueous electrolyte secondary battery, illustrating a process of forming the columnar bodies according to the first exemplary embodiment of this invention, and FIG. 5 is a schematic drawing showing a manufacturing apparatus used to form them. Although the description provided below is an example, in which only the first columnar bodies are formed on the convex portions on one surface of the current collector, this is for the purpose of simplifying the explanation. Therefore, the same method also applies when forming the second columnar bodies on the other surface. In addition, the following description represents an example using a negative electrode active material (occasionally referred to hereinafter as "active material") made of a material that contains at least silicon, as expressed by the formula of SiOx (0<x<2.0).

Manufacturing apparatus 40 shown in FIG. 5 for forming the columnar bodies has a structure comprising release/take-up reel 41, deposition roller 44a, take-up/release reel 45, deposition source 43a, masks 42 and oxygen nozzle 48a disposed inside vacuum chamber 46, which is decompressed by vacuum pump 47. Though manufacturing apparatus 40 shown here represents an example for making first columnar bodies on one surface of the current collector, the actual apparatus generally has such a structure as to be capable of making the first columnar bodies and the second columnar bodies on both surfaces of the current collector.

First, concave portions 12 and convex portions 13 are formed by a plating method on a surface of band-like electrolytic copper foil having 30 μm in thickness to prepare current collector 11 as shown in FIG. 4A and FIG. 5. Convex portions 13 in this instance are formed into a height of 5 μm and width of 10 μm at intervals of 20 μm. Current collector 11 is set between release/take-up reel 41 and take-up/release reel 45 shown in FIG. 5.

Next, using a deposition unit (.e., a unit assembled with a deposition source, a crucible pot and an electron beam generator), an active material such as Si (e.g., scrap silicon of a 99.999% purity) is evaporated and emitted from deposition source 43a provided in a position at an angle of $\omega_1$ (e.g., 55°) with respect to a direction of the normal of current collector 11 toward the top of each convex portion 13 of current collector 11 from a direction indicated by an arrow, as shown in FIG. 4B and FIG. 5. During this process, oxygen (O$_2$) is supplied if necessary from oxygen nozzle 48a toward current collector 11. When this is the case, the inside of vacuum chamber 46 is kept at a pressure of 3.5 Pa of oxygen atmosphere, for example. Oxygen nozzle 48a is set up at a position different from that of deposition source 43a, as shown in FIG. 5. An active material of generally homogeneous composition consisting of SiOx formed by combination of Si and oxygen in a film-forming area, which is bounded by masks 42, on current collector 11 supplied to deposition roller 44a, so that first columnar body 15 is formed into a predetermined height (or thickness) of 30 μm, for instance, at an angle of $\theta_1$ on the top portion of convex portion 13. First columnar bodies 15 consisting of SiOx, are thus formed. The value of x in the compound SiOx is designed by adjusting the amount of oxygen supplied thereto by taking into account an extent of the expansion due to insertion of lithium ions and a ratio of the void spaces among first columnar bodies 15, and it is practically in a range of 0<x<2. The negative electrode provided with first columnar bodies 15 is thus produced.

Figure 6:
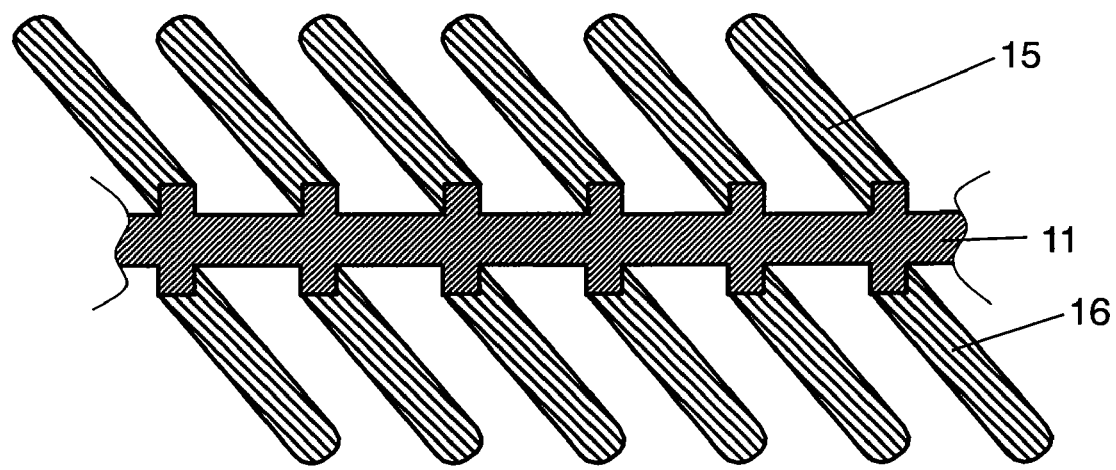
FIG. 6 is a partially sectioned schematic view showing another example of the negative electrode of the non-aqueous electrolyte secondary battery according to the first exemplary embodiment of the invention.

In this exemplary embodiment, although what has been described is an example having the first columnar bodies and the second columnar bodies arranged in the symmetrical manner, this is not restrictive. For instance, first columnar bodies 15 and second columnar bodies 16 can be arranged asymmetrically with respect to current collector 11, as shown in FIG. 6. In addition, the example described above shows the first columnar bodies and the second columnar bodies having the same tilting angle to the current collector, the same intervals and the same height (i.e., thickness). However, this is not restrictive, and they can be formed differently. As a result, the first columnar bodies at the inner side and the second columnar bodies at the outer side may be so designed as to optimize the confronting positive electrode mixture layer and an amount of the electrolyte retained within the void spaces when the electrodes are wound with the current collector placed therebetween.

Second Exemplary Embodiment

Description is provided hereinafter of a negative electrode of a non-aqueous electrolyte secondary battery in the second exemplary embodiment of the present invention with reference to FIG. 7A, FIG. 7B, FIG. 8A and FIG. 8B.

Figure 7A:
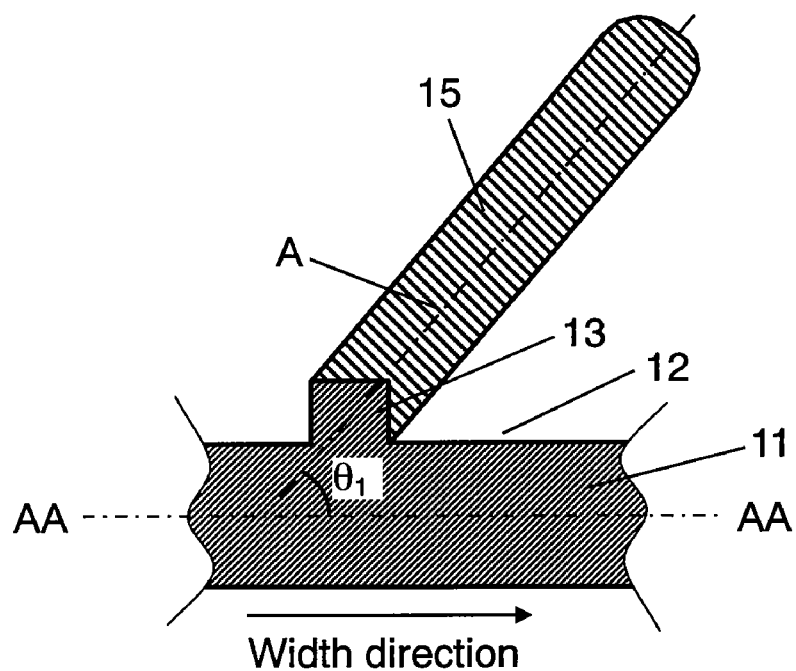
FIG. 7A is a partially sectioned schematic view showing a structure of a negative electrode according to a second exemplary embodiment of the present invention.
Figure 7B:
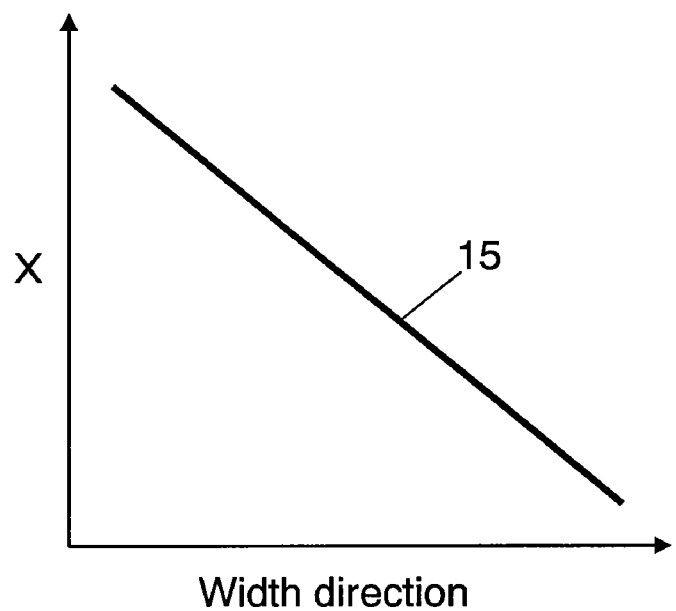
FIG. 7B is a graphic representation for explaining variation in a value of x of an active material in a width direction thereof according to the second exemplary embodiment of the invention.

FIG. 7A is a partially sectioned schematic view showing a structure of the negative electrode according to the second exemplary embodiment of this invention, and FIG. 7B is a graphic representation for explaining a variation in a value of x of an active material in a width direction according to the second exemplary embodiment of the invention. Description is provided hereinafter of an example wherein first columnar bodies 15 are formed on convex portions 13 on one of the surfaces of current collector 11 although the columnar bodies are actually formed on the both surfaces. The negative electrode of the second exemplary embodiment of this invention differs from that of the first exemplary embodiment in respect of that a content ratio of an element composing the first columnar bodies is varied along a width direction of the current collector.

That is, current collector 11 made of a conductive metal material such as a copper (Cu) foil, for instance, is provided with concave portions 12 and convex portions 13 in one of its surfaces in the same manner as the first exemplary embodiment, as shown in FIG. 7A. There are first columnar bodies 15 formed on the top portions of convex portions 13 in a tilting manner with an active material composing negative electrode 2 and expressed by the formula of SiOx, which is deposited by using an oblique vapor deposition technique such as sputtering or vacuum deposition method, for example. In this instance, first columnar bodies 15 are formed in a manner to tilt to the width direction of current collector 11.

As shown in the FIG. 7A, first columnar bodies 15 are formed at least on the top portions of convex portions 13 on current collector 11 so that the center line (A) in the tilting direction of first columnar bodies 15 and another center line (AA-AA) in the direction of thickness of current collector 11 intersect at an angle of $\theta_1$ (hereinafter referred to as "tilting angle"). In addition, first columnar bodies 15 are so formed that the value of x in content ratio of the element contained therein increases gradually in the width direction from one side of the tilting angle forming an acute angle toward the other side forming an obtuse angle of the first columnar bodies 15, as shown graphically in FIG. 7B. Although FIG. 7B shows that the value of x varies linearly, it is illustrative and not restrictive.

First columnar bodies 15 formed in the tilting manner on convex portions 13 of current collector 11 expand in their volumes due to the insertion of lithium ions when the non-aqueous electrolyte secondary battery is electrically charged. In this case, first columnar bodies 15 deform in a manner to rise, for example, as a result of an increase in the tilting angle $\theta_1$ of first columnar bodies 15 with the expansion of their volumes. When discharged, on the contrary, the tilting angle $\theta_1$ decreases and first columnar bodies 15 return close to their initial shape as their volumes contract due to extraction of the lithium ions. In this way, traveling distances of the lithium ions can be shortened when they are extracted from the first columnar bodies to the positive electrode mixture layer. As a result, this structure can realize the like advantageous effects as the first exemplary embodiment so as to achieve the non-aqueous electrolyte secondary battery of superior characteristics in low-temperature discharge as well as high-rate discharge.

Figure 8A:
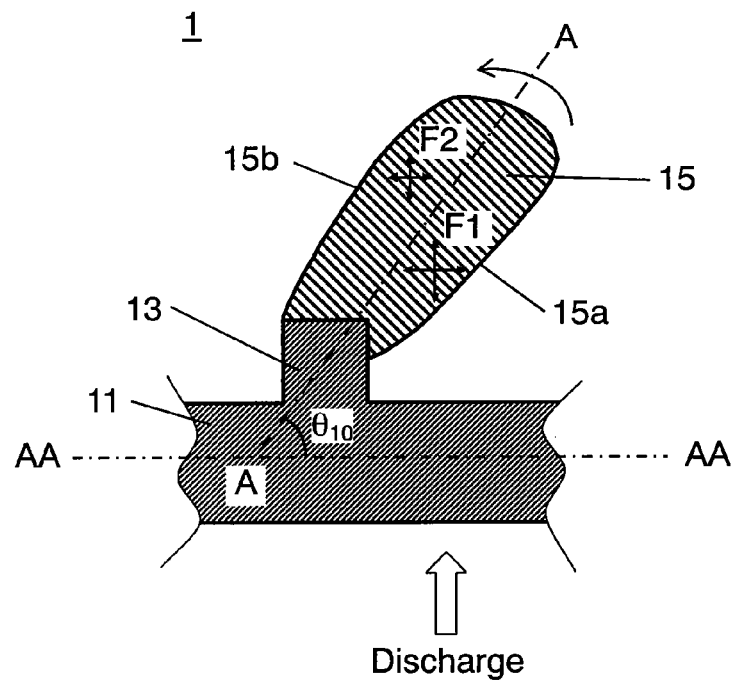
FIG. 8A is a partially sectioned schematic view showing a configuration of a columnar body of the negative electrode according to the second exemplary embodiment of the invention, in a state before being charged.
Figure 8B:
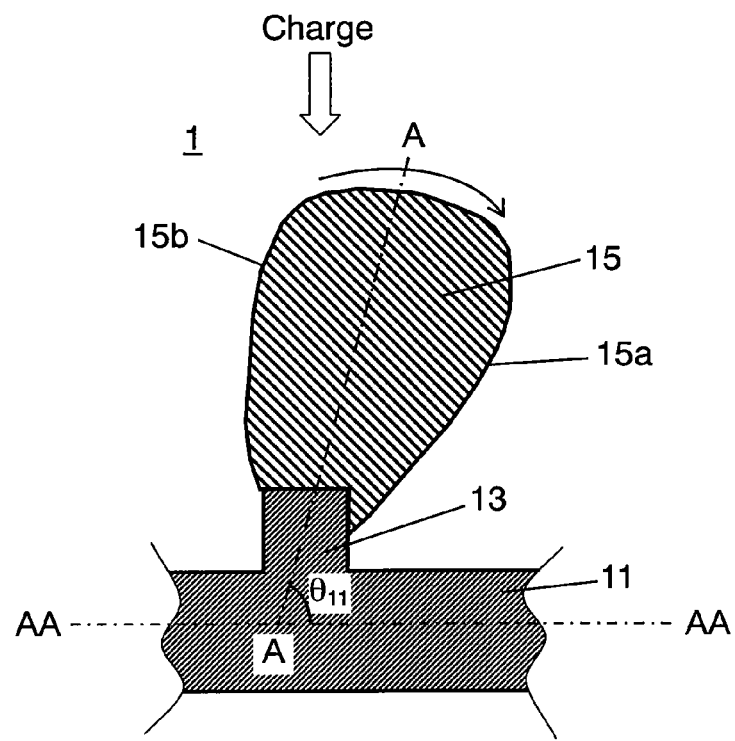
FIG. 8B is a partially sectioned schematic view showing a configuration of the columnar body of the negative electrode according to the second exemplary embodiment of the invention, in a state after having been charged.

Referring to FIG. 8A and FIG. 8B, description is provided hereinafter of a mechanism that reversibly changes the tilting angle of first columnar bodies 15 responsive to insertion and extraction of the lithium ions.

FIG. 8A is a partially sectioned schematic view showing a configuration of a columnar body of the negative electrode in a state before being charged according to the second exemplary embodiment of this invention, and FIG. 8B is a partially sectioned schematic view showing a configuration of the columnar body of the negative electrode in a state after having been charged according to the second exemplary embodiment of the invention.

First columnar body 15 shown in the FIG. 8A and FIG. 8B is so formed that the content ratio of the oxygen element contained in the active material composed of SiOx is varied in a manner that the value of x increases continually from lower side 15a of first columnar body 15, where the center line (A-A) of first columnar body 15 and another center line (AA-AA) of current collector 11 form an acute angle, toward upper side 15b of first columnar body 15, where they form an obtuse angle, as shown in FIG. 7B. The active material composed of SiOx has such a property that a degree of expansion caused by the insertion of lithium ions becomes smaller as the value of x increases from 0 to 2.

In other words, an expanding stress produced by the expansion of first columnar body 15 attributed to insertion of the lithium ions during the charging process decreases continually from a value F1 in lower side 15a toward another value F2 in upper side 15b, as shown in FIG. 8A. As a consequence, the tilting angle θ formed between the center line (A-A) of first columnar body 15 and another center line (AA-AA) of current collector 11 changes from angle $\theta_{10}$ to angle $\theta_{11}$, such that first columnar body 15 rises up in the direction shown by an arrow in FIG. 8A. On this contrary, the expanding stresses decrease during the discharging process due to contraction caused by extraction of the lithium ions. Consequently, the tilting angle θ of first columnar body 15 changes from angle $\theta_{11}$ to angle $\theta_{10}$, so that first columnar body 15 deforms in the direction shown by an arrow in FIG. 8B.

As discussed above, first columnar bodies 15 change their tilting angle reversibly due to insertion and extraction of the lithium ions.

Description is provided hereinafter of a method of manufacturing the columnar bodies on the negative electrode of the non-aqueous electrolyte secondary battery according to the second exemplary embodiment of this invention. In principle, the method is similar to that of the first exemplary embodiment except for one different aspect, in which oxygen is supplied during the process of forming the first columnar bodies in order to vary the value of x of SiOx in the tilting direction of the first columnar bodies. Description is therefore given mainly of the different aspect with reference to FIG. 4A, FIG. 4B and FIG. 5 of the first exemplary embodiment.

In other words, the columnar bodies on the negative electrode of the non-aqueous electrolyte secondary battery according to the second exemplary embodiment of this invention are made with manufacturing apparatus 40 used to form the columnar bodies shown in FIG. 5, in which oxygen nozzle 48a is disposed in the vicinity of mask 42 next to take-up/release reel 45, for instance. In this structure, an amount of silicon evaporated from the deposition source decreases and an oxygen concentration supplied from the oxygen nozzles increases as the current collector moves in the direction away from the deposition source. As a result, a first columnar body having SiOx of varied value of x along its tilting direction is formed into a predetermined height (or thickness) of 30 μm, for instance, at an angle of $\theta_1$ on the top portion of convex portion 13. The value of x in the compound SiOx is designed by adjusting the amount of oxygen supplied thereto by taking into account an extent of the expansion due to insertion of lithium ions and a ratio of the void spaces formed among first columnar bodies 15, and it is practically in a range of 0<x<2. The negative electrode provided with first columnar bodies 15 is thus produced.

In this exemplary embodiment, the first columnar bodies and the second columnar bodies can be arranged asymmetrically with respect to the current collector in the like manner as the first exemplary embodiment. In addition, the first columnar bodies and the second columnar bodies can be formed at different tilting angles to the current collector, different intervals and different heights (i.e., thickness). Accordingly, the first columnar bodies at the inner side and the second columnar bodies at the outer side can be made so as to optimize the confronting positive electrode mixture layer and an amount of the electrolyte retained within the void spaces when the electrodes are wound with the current collector placed therebetween.

Third Exemplary Embodiment

Description is provided hereinafter of a negative electrode of a non-aqueous electrolyte secondary battery in the third exemplary embodiment of the present invention with reference to FIG. 9 and FIG. 10A to FIG. 10C.

Figure 9:
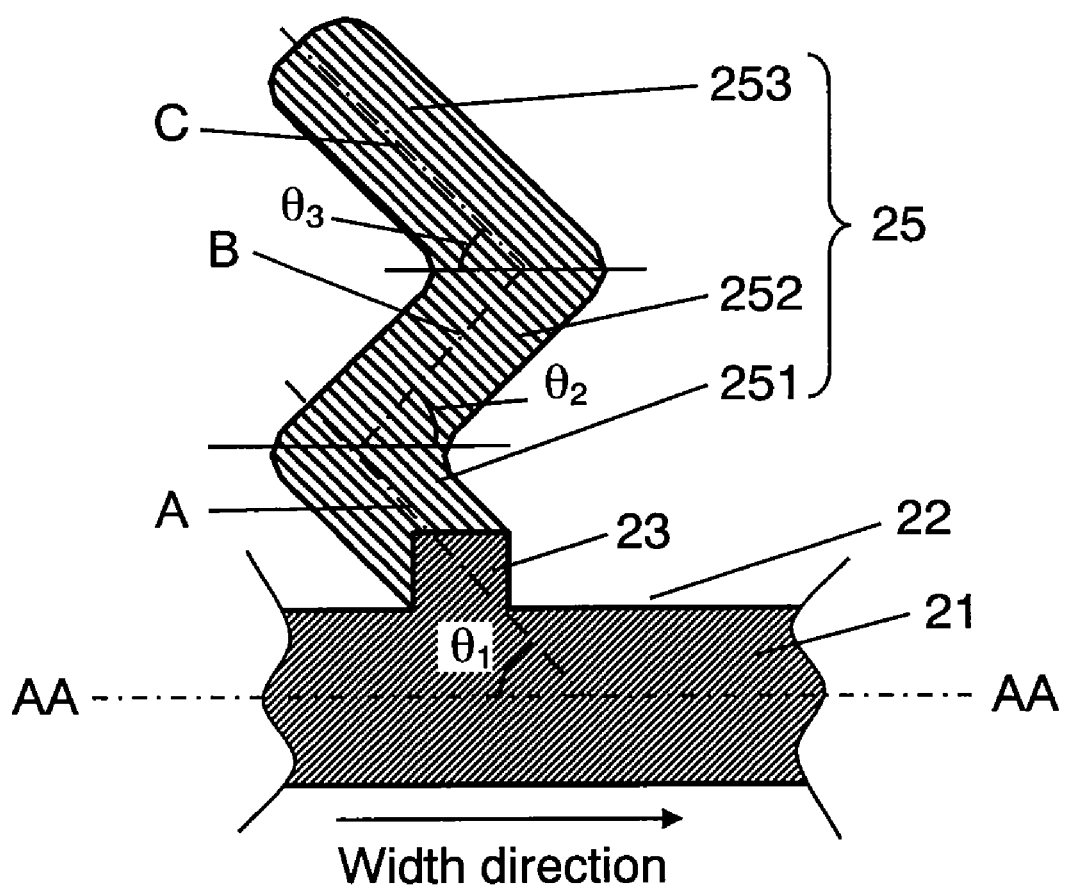
FIG. 9 is a partially sectioned schematic view showing a structure of a negative electrode of a non-aqueous electrolyte secondary battery according to a third exemplary embodiment of the present invention.
Figure 10A:
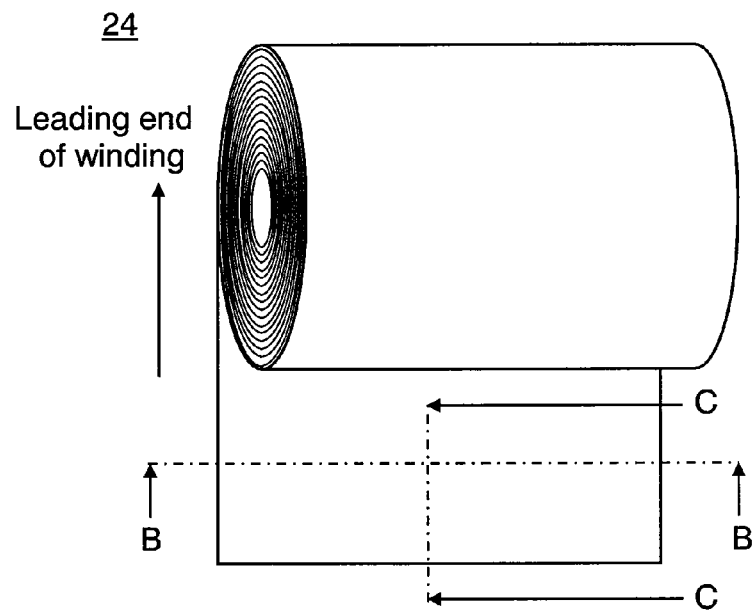
FIG. 10A is a perspective view showing schematically a winding state of only the negative electrode within an electrode group of the non-aqueous electrolyte secondary battery according to the third exemplary embodiment of the invention.
Figure 10B:
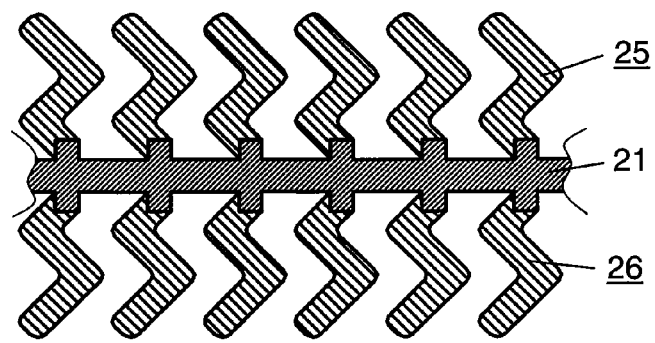
FIG. 10B is a sectional view taken along the line B-B of FIG. 10A.
Figure 10C:
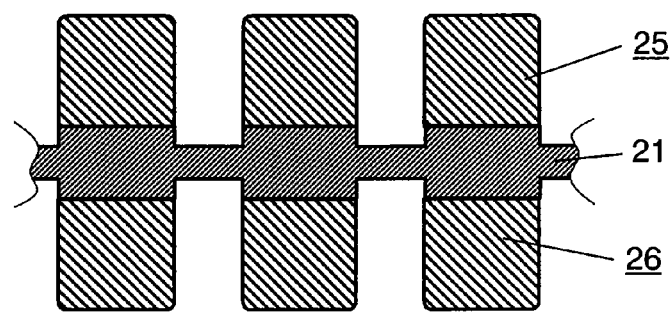
FIG. 10C is a sectional view taken along the line C-C of FIG. 10A.

FIG. 9 is a partially sectioned schematic view showing a structure of the negative electrode of the non-aqueous electrolyte secondary battery of the third exemplary embodiment of this invention. FIG. 10A is a perspective view schematically showing a winding state of only the negative electrode within an electrode group of the non-aqueous electrolyte secondary battery according to the third exemplary embodiment of this invention, FIG. 10B is a sectional view taken along the line B-B of FIG. 10A, and FIG. 10C is a sectional view taken along the line C-C of FIG. 10A. The negative electrode of the third exemplary embodiment of this invention differs from that of the first exemplary embodiment in respect of that each of first columnar bodies and second columnar bodies formed on the convex portions of a current collector is composed of n stages (where n>2), and an odd-number stage and an even-number stage are tilted to different orientations. Although the description provided here for FIG. 9 is an example, in which only first columnar bodies 25 are formed on the convex portions on one surface of the current collector, this is for the purpose of simplifying the description, and that the current collector basically has first columnar bodies 25 and second columnar bodies 26 on both surfaces thereof as shown in FIG. 10A to FIG. 10C.

In other words, current collector 21 made of a conductive metal material such as a copper (Cu) foil, for instance, is provided with concave portions 22 and convex portions 23 at least in its upper surface, as shown in FIG. 9. There are first columnar bodies 25 formed on the top portions of convex portions 23 with an active material composing negative electrode 2 and expressed by the formula of SiOx, which is deposited by using an oblique vapor deposition technique such as sputtering or vacuum deposition method, for example, in a manner that each of first columnar bodies 25 comprises n stages, where n=3, of columnar body portions in a tilting orientation along the width direction of current collector 21. In this instance, first columnar body 25 is composed of a plurality of columnar body portions, of which an odd-number stage and an even-number stage are tilted to different orientations. Each of second columnar bodies 26 is also formed with a plurality of columnar body portions having an odd-number stage and an even-number stage tilted to different orientations into a zigzag configuration, for instance, as shown in FIG. 10B.

The embodiment herein described concretely is an example of first columnar body 25 composed of three stages, i.e., n=3, of overlaid columnar body portions 251, 252 and 253. However, this is not restrictive and that the "n" can be any integral number not smaller than 2.

First, columnar body portion 251 of first columnar body 25 is formed at least on the top portion of convex portion 23 on current collector 21 so that the center line (A) in a tilting orientation of first columnar body portion 251 and another center line (AA-AA) in the direction of thickness of current collector 21 form a tilting angle of $\theta_1$. Columnar body portion 252 of first columnar body 25 is then formed on top of columnar body portion 251 so that the center line (B) along its tilting orientation and the center line (AA-AA) in the direction of thickness of current collector 21 form a tilting angle of $\theta_2$. Furthermore, columnar body portion 253 of first columnar body 25 is formed on top of columnar body portion 252 so that the center line (C) along its tilting orientation and the center line (AA-AA) in the direction of thickness of current collector 21 form another tilting angle of $\theta_3$. Here, the tilting angles $\theta_1$, $\theta_2$ and $\theta_3$ can be the same angle or different angles so long as the adjoining first columnar bodies 25 do not come in contact with each other. In this embodiment, first columnar bodies 25 and second columnar bodies 26 are so provided that columnar body portions of the odd-number stages and the even-number stages are tilted to different orientations along the width direction in relation to the winding direction of an electrode group constructed by winding a positive electrode, negative electrode 24 and separator 3, as shown in FIG. 10B. In addition, first columnar bodies 25 and second columnar bodies 26 are arranged in a symmetrical manner with respect to current collector 21. Moreover, first columnar bodies 25 and second columnar bodies 26 are provided generally in parallel to the winding direction of current collector 21 as shown in FIG. 10C.

First columnar bodies 25 formed in the three tilted stages of zigzag configuration on convex portions 23 of current collector 21 expand in their volumes due to insertion of lithium ions when the non-aqueous electrolyte secondary battery is charged. On the other hand, their volumes contract due to extraction of the lithium ions when the battery is discharged. When first columnar bodies 25 and second columnar bodies 26 are made to be equal in height in a direction of the normal of current collector 21, for instance, the volumes of the individual columnar bodies can be increased by forming them in the n-stage configuration. As a result, a capacity of the battery can be improved further since they can insert and extract a larger amount of lithium ions. In addition, the columnar body portions of the n-stage configuration can alleviate stresses developed in the junctions between the columnar bodies and the convex portions on the current collector when placed in contact with the positive electrode mixture layer since the individual columnar body portions need to absorb only fractions of the stresses distributed upon them as compared to the columnar bodies of one-stage configuration, thereby providing the non-aqueous electrolyte secondary battery of superior reliability with a remote possibility of developing separations and fractures in the junctions.

At the start of charging, first columnar bodies 25 and second columnar bodies 26 having the three stages of the columnar body portions are uprightly tilted on convex portions 23 of current collector 21 in such shapes that they partially cover concave portions 22 in current collector 21 when first columnar bodies 25 and second columnar bodies 26 are observed in a projected plane from the positive electrode side, as shown in FIG. 10B. This structure can therefore prevent deposition of lithium metal since lithium ions extracted from the positive electrode during a charging process are interfered with by first columnar bodies 25 and second columnar bodies 26 of the negative electrode, and most of the ions are inserted by first columnar bodies 25 and second columnar bodies 26 instead of reaching directly to concave portions 22 in current collector 21. There is thus achieved the non-aqueous electrolyte secondary battery of superior reliability and cycle characteristics.

Referring to FIG. 11A to FIG. 11D and FIG. 12, description is provided hereinafter of a method of manufacturing the columnar bodies on the negative electrode of the non-aqueous electrolyte secondary battery according to the third exemplary embodiment of this invention.

Figure 11A:
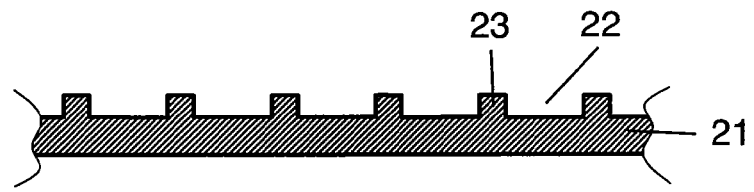
FIG. 11A is a partially sectioned schematic view of the negative electrode of the non-aqueous electrolyte secondary battery, illustrating a process of forming the columnar bodies, each consisting of n stages (where n=3) of columnar body portions, according to the third exemplary embodiment of the invention.
Figure 11B:
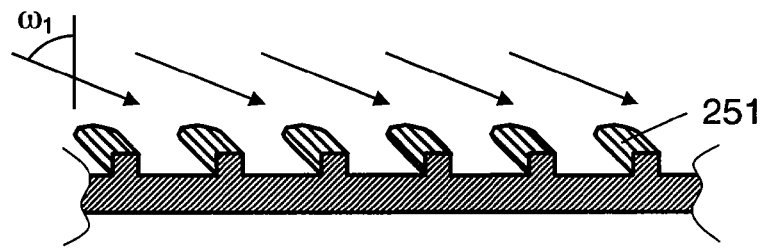
FIG. 11B is another partially sectioned schematic view of the negative electrode of the non-aqueous electrolyte secondary battery, illustrating the process of forming the columnar bodies, each consisting of n stages (where n=3) of the columnar body portions, according to the third exemplary embodiment of the invention.
Figure 11C:
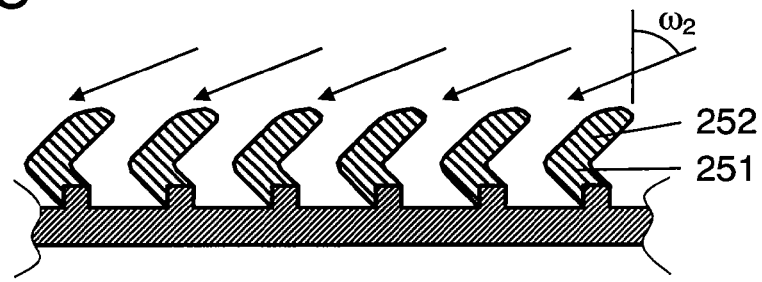
FIG. 11C is still another partially sectioned schematic view of the negative electrode of the non-aqueous electrolyte secondary battery, illustrating the process of forming the columnar bodies, each consisting of n stages (where n=3) of the columnar body portions, according to the third exemplary embodiment of the invention.
Figure 11D:
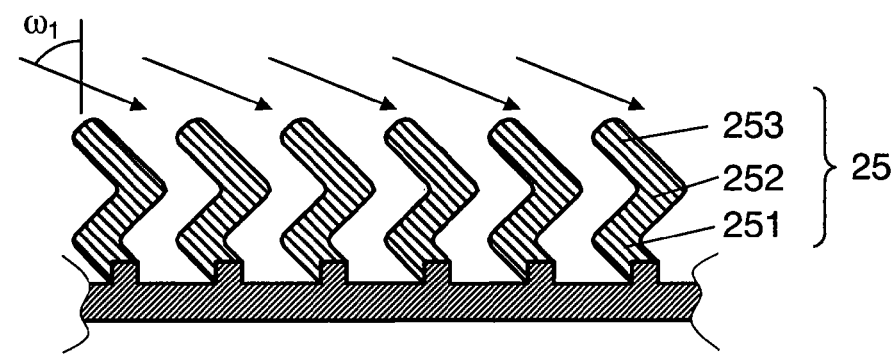
FIG. 11D is yet another partially sectioned schematic view of the negative electrode of the non-aqueous electrolyte secondary battery, illustrating the process of forming the columnar bodies, each consisting of n stages (where n=3) of the columnar body portions, according to the third exemplary embodiment of the invention.
Figure 12:
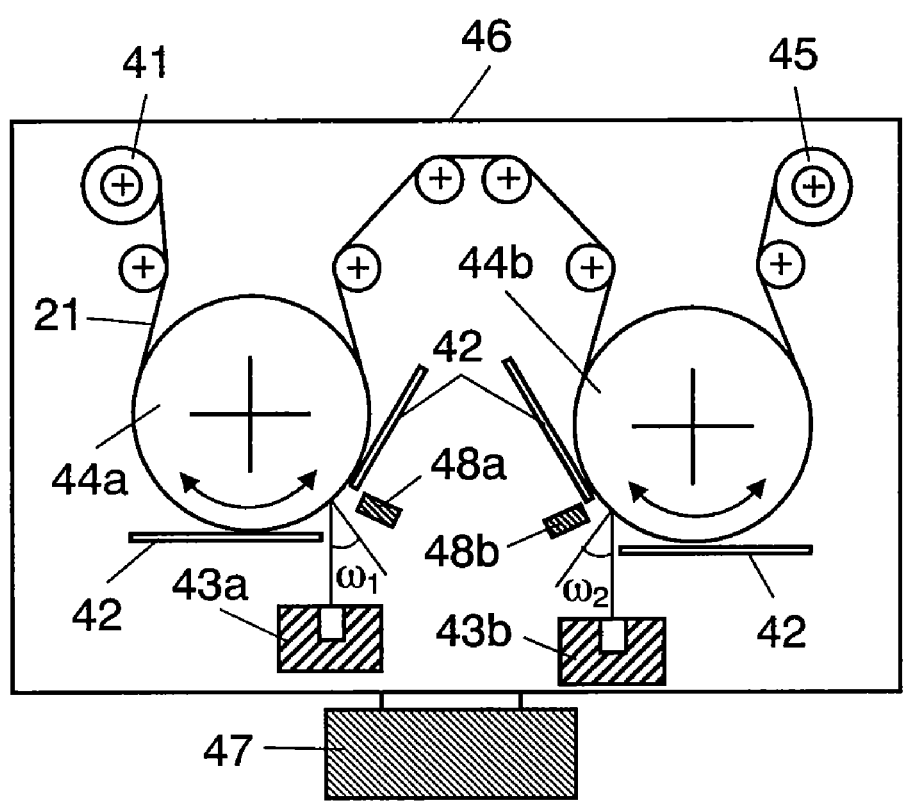
FIG. 12 is a schematic drawing illustrating a manufacturing apparatus used to form the columnar bodies consisting of n stages (where n=3) of the columnar body portions on the negative electrode of the non-aqueous electrolyte secondary battery according to the third exemplary embodiment of the invention.

FIG. 11A to FIG. 11D are partially sectioned schematic views of the negative electrode of the non-aqueous electrolyte secondary battery, illustrating the process of forming the columnar bodies, each consisting of n stages of the columnar body portions, wherein n=3, according to the third exemplary embodiment of the invention, and FIG. 12 is a schematic drawing illustrating a manufacturing apparatus used to form them. Although the description provided below is an example, in which only the first columnar bodies are formed on the convex portions on one surface of the current collector, this is for the purpose of simplifying the description. Therefore, the same method can also apply when forming the second columnar bodies on the other surface. In addition, the following description represents an example using an active material made of a material that contains at least silicon, as expressed by the formula of SiOx (where 0<x<2.0).

Manufacturing apparatus 240 shown in FIG. 12 for forming the columnar bodies has a structure similar to the manufacturing apparatus illustrated in FIG. 5, and it comprises release/take-up reel 41, deposition rollers 44a and 44b, take-up/release reel 45, deposition sources 43a and 43b, masks 42 and oxygen nozzles 48a and 48b inside vacuum chamber 46, which is decompressed by vacuum pump 47. Though manufacturing apparatus 240 shown here represents an example for making columnar bodies by forming n-number stages of columnar body portions on one surface of the current collector, the actual apparatus generally has a structure capable of making the columnar bodies on both surfaces of the current collector.

First, concave portions 22 and convex portions 23 are formed by a plating method on a surface of a band-like electrolytic copper foil having 30 μm in thickness to prepare current collector 21, as shown in FIG. 11A and FIG. 12. Convex portions 23 in this instance are formed into a height of 5 μm and a width of 10 μm at intervals of 20 μm. Current collector 21 is set between release/take-up reel 41 and take-up/release reel 45 shown in FIG. 12.

Next, using a deposition unit (i.e., a unit assembled with a deposition source, a crucible pot and an electron beam generator), an active material such as Si (e.g., scrap silicon of a 99.999% purity) is evaporated and emitted from deposition source 43a provided in a position at an angle of $\omega_1$ (e.g., 55°) with respect to a direction of the normal of current collector 21 toward the top of each convex portion 23 on current collector 21 from a direction indicated by an arrow as shown in FIG. 11B and FIG. 12. During this process, oxygen ($O_2$) is supplied if necessary from oxygen nozzle 48a toward current collector 21. When this is the case, the inside of vacuum chamber 46 is kept at a pressure of 3.5 Pa of oxygen atmosphere, for example. An active material of generally homogeneous composition consisting of SiOx is formed by combination of Si and oxygen in a film-forming area, which is bounded by mask 42, on current collector 21 supplied to deposition roller 44a, so that a first stage of columnar body portion 251 is formed into a predetermined height (or thickness) of 5 μm, for instance, at an angle of $\theta_1$ on the top portion of convex portion 23.

In the next step, current collector 21 having the first stage of columnar body portion 251 formed on convex portion 23 is advanced to a subsequent position on deposition roller 44b as shown in FIG. 11C and FIG. 12. Using another deposition unit (i.e., a unit assembled with a deposition source, a crucible pot and an electron beam generator) disposed in a position facing deposition roller 44b, an active material such as Si (e.g., scrap silicon of a 99.999% purity) is evaporated and emitted from deposition source 43b provided in a position at an angle of $\omega_2$ (e.g., 55°) with respect to the direction of the normal of current collector 21 toward the first stage of columnar body portion 251 on current collector 21 from a direction indicated by an arrow in the figure. During this process, oxygen ($O_2$) is supplied if necessary from oxygen nozzle 48b toward current collector 21. The active material of generally homogeneous composition consisting of SiOx is formed by combination of Si and oxygen in a film-forming area, which is bounded by masks 42, on current collector 21 advanced to deposition roller 44b, and a second stage of columnar body portion 252 is thus formed into a predetermined height (or thickness) of 12.5 μm, for instance, at a predetermined angle of $\theta_2$ on top of the first stage of columnar body portion 251. As a result of the above steps, the first stage of columnar body portion 251 and the second stage of columnar body portion 252 are formed with their value s of x varied along directions opposite of the moving directions of the current collector, and in different tilting angles and tilting orientations with respect to each other.

Subsequently, as shown in FIG. 11D and FIG. 12, current collector 21 provided with the second stage of columnar body portion 252 formed thereon is returned to the previous position on deposition roller 44a by driving release/take-up reel 41 and take-up/release reel 45 in reverse, and a third stage of columnar body portion 253 is formed into a predetermined height (or thickness) of 12.5 μm, for instance, on top of the second stage of columnar body portion 252 in the same manner as the step taken in FIG. 11B. As a result, the second stage of columnar body portion 252 and the third stage of columnar body portion 253 are formed with their values of x varied along directions opposite of the moving directions of the current collector, and in different tilting angles and tilting orientations with respect to each other. In the case discussed above, the first stage of columnar body portion 251 and the third stage of columnar body portion 253 are formed in the same orientation. As a consequence, there is provided a negative electrode having first columnar bodies 25 comprised of three stages of the columnar body portions formed of compound SiOx.

The value of x in the compound SiOx is designed by adjusting the amount of oxygen supplied thereto by taking into account an extent of the expansion due to insertion of lithium ions and a ratio of the void spaces provided among first columnar bodies 25, and it is practically in a range of 0<x<2. The negative electrode provided with first columnar bodies 25 is thus produced.

In the above embodiment, although what has been described is an example, in which first columnar bodies 25 are composed of the columnar body portions of three stages, i.e., n=3, this is not restrictive. For instance, the first columnar bodies composed of any number of stages (n>2) of the columnar body portions can be formed by repeating the steps shown above in FIG. 11C to FIG. 11D.

Manufacturing apparatus 240 described above represents one example, in which the individual columnar bodies are produced by reversing release/take-up reel 41 and take-up/release reel 45. However, apparatuses of various structures are also adoptable other than the above. For example, the apparatus shown in FIG. 12 may be provided with a plurality of deposition rollers in series so that first columnar bodies of n-number stages are formed while moving the current collector in one direction.

Though the above embodiment represents an example showing the first columnar bodies formed on one surface of the current collector, the actual practice is to form the first columnar bodies and second columnar bodies on both surfaces of the current collector. In a such application, the structure of the manufacturing apparatus can be so altered that second columnar bodies are formed on one of the surfaces of the current collector after completing the first columnar bodies on the other surface, or the first columnar bodies and the second columnar bodies may be formed simultaneously on both surfaces. In this way, the negative electrode can be produced highly productivity.

Figure 13:
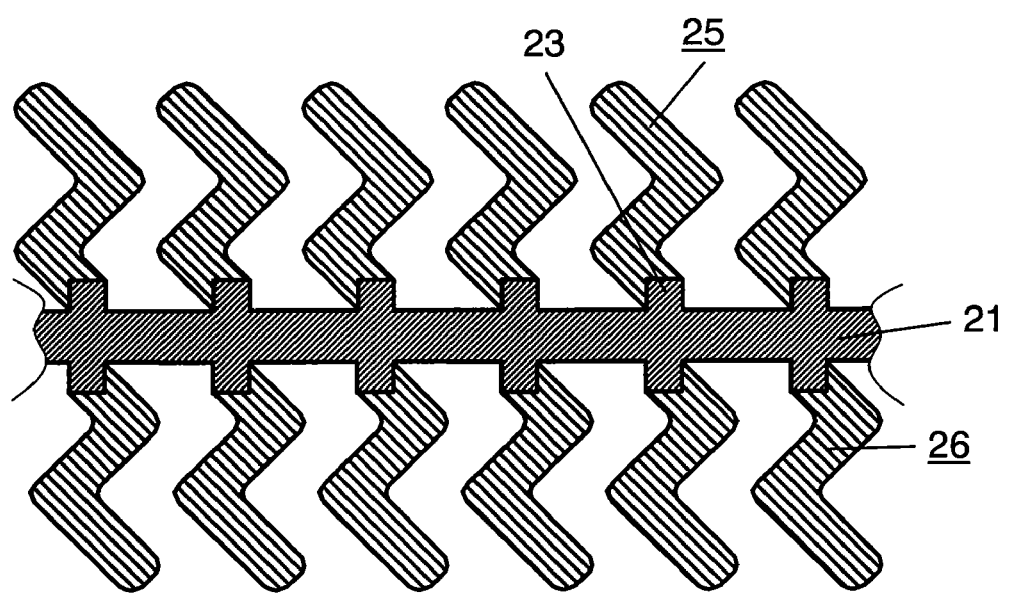
FIG. 13 is a sectional view showing another example of the negative electrode of the non-aqueous electrolyte secondary battery according to the third exemplary embodiment of the invention.

In this exemplary embodiment, although what has been described is an example having the first columnar bodies and the second columnar bodies arranged in the symmetrical manner, this is not restrictive. For instance, first columnar bodies 25 and second columnar bodies 26 can be arranged asymmetrically with respect to current collector 21, as shown in FIG. 13. In addition, the example described above shows the first columnar bodies and the second columnar bodies having the same tilting angle to the current collector, the same intervals and the same height (i.e., thickness). This is not restrictive however, that they can be formed differently. As a result, the first columnar bodies at the inner side and the second columnar bodies at the outer side can be so made as to optimize the confronting positive electrode mixture layer and an amount of the electrolyte retained within the void spaces when the electrodes are wound with the current collector placed therebetween.

Fourth Exemplary Embodiment

Description is provided hereinafter of a negative electrode of a non-aqueous electrolyte secondary battery in the fourth exemplary embodiment of the present invention with reference to FIG. 14A and FIG. 14B.

Figure 14A:
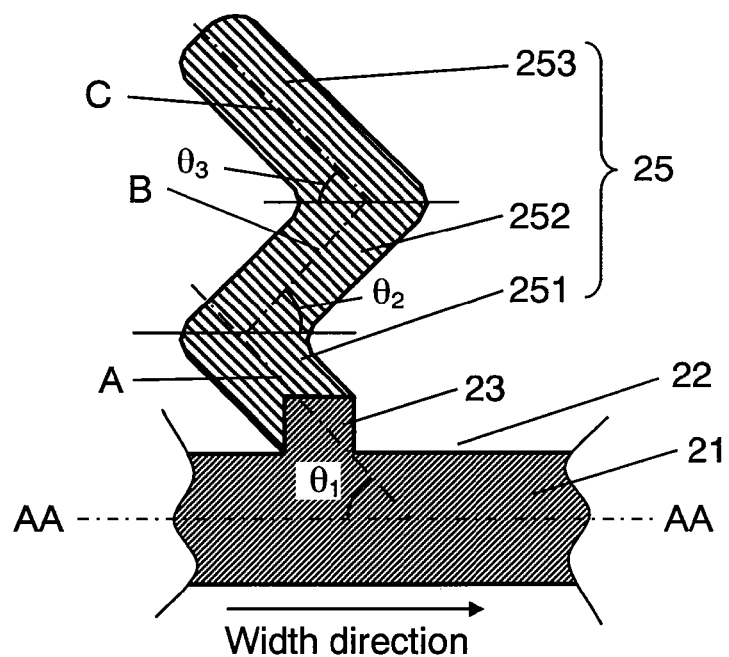
FIG. 14A is a partially sectioned schematic view showing a structure of a negative electrode according to a fourth exemplary embodiment of the present invention.
Figure 14B:
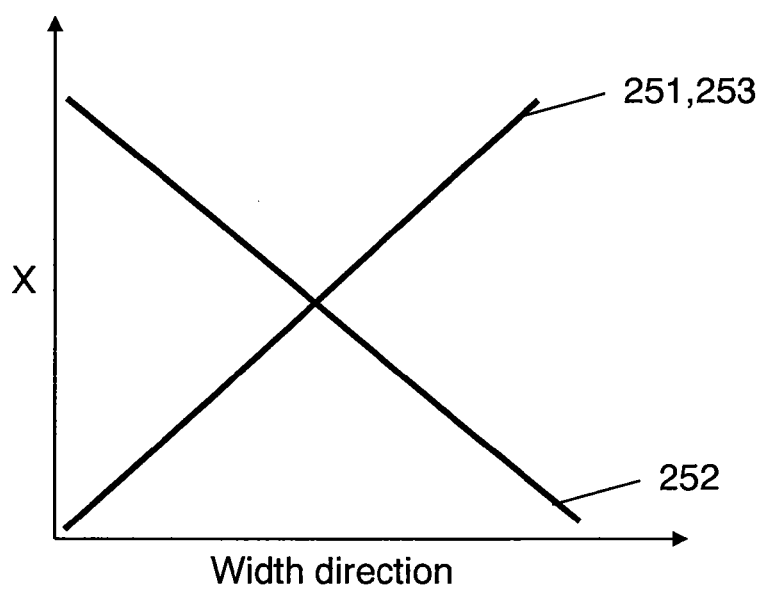
FIG. 14B is a graphic representation for explaining variation in a value of x of an active material in a width direction thereof according to the fourth exemplary embodiment of the invention.

FIG. 14A is a partially sectioned schematic view showing a structure of the negative electrode according to the fourth exemplary embodiment of this invention, and FIG. 14B is a graphic representation for explaining variation in a value of x of an active material in a width direction according to the fourth second exemplary embodiment of the invention. Description provided hereinafter is of an example, wherein first columnar bodies 25 are formed on convex portions 23 on one of the surfaces of current collector 21 although the columnar bodies are actually formed on both surfaces of the current collector. The negative electrode of the fourth exemplary embodiment of this invention differs from that of the third exemplary embodiment in respect of that a content ratio of an element composing the first columnar bodies is varied along a width direction of the current collector.

In other words, current collector 21 made of a conductive metal material such as a copper (Cu) foil, for instance, is provided with concave portions 22 and convex portions 23 in at least one of its surfaces, as shown in FIG. 14A, in the same manner as the third exemplary embodiment. There are first columnar bodies 25 formed on the top portions of convex portions 23 with an active material composing negative electrode 2 and expressed by the formula of SiOx, which is deposited by using an oblique vapor deposition technique such as sputtering or vacuum deposition method, for example, in a manner that each of first columnar bodies 25 has a configuration comprising n stages (e.g., n>2) of columnar body portions in a tilting orientation along the width direction of current collector 21. In this instance, first columnar body 25 is composed of a plurality of columnar body portions, of which an odd-number stage and an even-number stage are tilted to different orientations. Each of second columnar bodies 26 is also formed with a plurality of columnar body portions having an odd-number stage and an even-number stage tilted to different orientations into a zigzag configuration, for instance.

The embodiment herein described concretely is an example of first columnar body 25 composed of three stages, i.e., n=3, of overlaid columnar body portions 251, 252 and 253. However, this is not restrictive and that the "n" can be any integral number not smaller than 2.

That is, in the like manner as the third exemplary embodiment, columnar body portion 251 of first columnar body 25 is formed at least on the top portion of convex portion 23 on current collector 21 so that the center line (A) in a tilting orientation of first columnar body portion 251 and another center line (AA-AA) in the direction of thickness of current collector 21 form a tilting angle of $\theta_1$, as shown in FIG. 14A. Columnar body portion 252 of first columnar body 25 is then formed on top of columnar body portion 251 so that the center line (B) along its tilting orientation and the center line (AA-AA) in the direction of thickness of current collector 21 form a tilting angle of $\theta_2$. Furthermore, columnar body portion 253 of first columnar body 25 is formed on top of columnar body portion 252 so that the center line (C) along its tilting orientation and the center line (AA-AA) in the direction of thickness of current collector 21 form another tilting angle of $\theta_3$.

Here, the tilting angles $\theta_1$, $\theta_2$ and $\theta_3$ can be same angle or different angles so long as the adjoining first columnar bodies 25 do not come in contact with each other.

Moreover, columnar body portions 251, 252 and 253 composing first columnar body 25 are so formed that, for example, a value of x in content ratio of the element contained therein varies in the width direction of each of them, but in different directions between odd-number stage columnar body portions 251 and 253 and even-number columnar body portion 252, as shown graphically in FIG. 14B. In other words, the value of x of the element contained in each of columnar body portions 251, 252 and 253 is increased gradually from one side of the tilting angle forming an acute angle toward the other side forming an obtuse angle. Although FIG. 14B shows that the value of x varies linearly, it is illustrative and not restrictive.

First columnar bodies 25 formed on convex portions 23 of current collector 21 in the three tilted stages of zigzag configuration expand in their volumes due to insertion of lithium ions when the non-aqueous electrolyte secondary battery is charged. In this case, first columnar bodies 25 deform in a manner to rise, for example, as a result of the increase in the tilting angles $\theta_1$, $\theta_2$ and $\theta_3$ of columnar body portions 251, 252 and 253 of first columnar bodies 25 with the expansion of their volumes, as has been discussed in detail of the mechanism by referring to FIG. 8A and FIG. 8B in the second exemplary embodiment. When discharged, on the contrary, the tilting angles $\theta_1$, $\theta_2$ and $\theta_3$ decrease and first columnar bodies 25 return close to their initial zigzag configuration as their volumes contract due to extraction of the lithium ions.

In this way, traveling distances of the lithium ions can be shortened when they are extracted from the first columnar bodies to the positive electrode mixture layer. As a result, this structure can realize the like advantageous effects as the third exemplary embodiment so as to achieve the non-aqueous electrolyte secondary battery of superior characteristics in the low-temperature discharge as well as the high-rate discharge.

Description is provided hereinafter of a method of manufacturing columnar bodies on the negative electrode of the non-aqueous electrolyte secondary battery according to the fourth exemplary embodiment of the present invention. In principle, the method is similar to that of the third exemplary embodiment except for one different aspect, in which oxygen is supplied during the process of forming the first columnar bodies in order to vary the value of x of SiOx in the tilting direction of the first columnar bodies. Description is therefore given mainly of the different aspect with reference to FIG. 11A to FIG. 11D and FIG. 12 of the third exemplary embodiment.

That is, the columnar bodies on the negative electrode of the non-aqueous electrolyte secondary battery according to the fourth exemplary embodiment of this invention are made with manufacturing apparatus 240 used to form the columnar bodies shown in FIG. 12, in which oxygen nozzles 48a and 48b are disposed in the upper area in the vicinity of mask 42, for instance.

In the first step of forming columnar body portion 251, an amount of silicon evaporated from deposition source 43a decreases and an oxygen concentration supplied from oxygen nozzle 48a increases as the current collector moves in the direction away from deposition source 43a in the same manner as the third exemplary embodiment, as shown in FIG. 11B and FIG. 12. As a result, the first stage of columnar body portion 251 having SiOx of varied value of x along the tilting direction of the first columnar body is formed into a predetermined height (or thickness) of 5 μm, for instance, at an angle of $\theta_1$ on the top portion of convex portion 23. In this example shown in FIG. 11B, the value of x becomes smaller at the left side of the drawing, and the value of x increases toward the right side of it.

Next, current collector 21 having the first stage of columnar body portion 251 formed on convex portion 23 is advanced to a subsequent position on deposition roller 44b as shown in FIG. 11C and FIG. 12. This moves current collector 21 in the direction toward deposition source 43b, so that an amount of silicon evaporated from deposition source 43b increases and an oxygen concentration supplied from oxygen nozzle 48b decreases while the film-formation takes place. A second stage of columnar body portion 252 is thus formed into a predetermined height (or thickness) of 12.5 μm, for instance, at a predetermined angle of $\theta_2$ on top of the first stage of columnar body portion 251 with the active material of SiOx produced by combination of Si and the oxygen. Columnar body portion 252 is so formed that the value of x of SiOx varies along the moving direction of current collector 21 in the same manner as the first stage of columnar body portion 251. In the second stage of columnar body portion 252 shown in FIG. 11C, for example, the value of x becomes smaller at the right side of it, and the value of x increases toward the left side in the drawing. As a result, the first stage of columnar body portion 251 and the second stage of columnar body portion 252 are formed with their values of x varied along the directions opposite of the moving directions of the current collector, and in different tilting angles and tilting orientations with respect to each other.

Subsequently, as shown in FIG. 11D and FIG. 12, current collector 21 provided with the second stage of columnar body portion 252 formed thereon is returned to the previous position on deposition roller 44a by driving release/take-up reel 41 and take-up/release reel 45 in reverse, and a third stage of columnar body portion 253 is formed into a predetermined height (or thickness) of 12.5 μm, for instance, at an angle of $\theta_3$ on top of the second stage of columnar body portion 252 in the same manner as the step taken in FIG. 11B. In the third stage of columnar body portion 253 shown in FIG. 11D, the value of x becomes smaller at the left side of the drawing, and the value of x increases toward the right side of it. As a result, the second stage of columnar body portion 252 and the third stage of columnar body portion 253 are formed with their values of x varied along the directions opposite of the moving directions of the current collector, and in different tilting angles and tilting orientations with respect to each other. In the case discussed above, the first stage of columnar body portion 251 and the third stage of columnar body portion 253 are formed in the same orientation. As a consequence, there is provided a negative electrode having first columnar bodies 25 comprised of three stages of the columnar body portions.

Here, the value of x in the compound SiOx is designed by adjusting the amount of oxygen supplied thereto by taking into account an extent of the expansion due to insertion of lithium ions and a ratio of the void spaces provided among first columnar bodies 25, and it is practically in a range of $0<x<2$.

In this exemplary embodiment, the first columnar bodies and the second columnar bodies may be arranged in an asymmetrical manner with respect to the current collector, as indicated in the third exemplary embodiment. In addition, the first columnar bodies and the second columnar bodies may be formed differently in their tilting angles to the current collector, intervals and the heights (i.e., thicknesses). As a result, the first columnar bodies at the inner side and the second columnar bodies at the outer side can be made so as to optimize the confronting positive electrode mixture layer and an amount of the electrolyte retained within the void spaces when the electrodes are wound with the current collector placed therebetween.

The present invention will be described hereinafter in more concrete manner by using some embodied examples. It should be understood, however, that the following examples are not to be taken in a limited sense, but the present invention can be embodied or practiced in other specific forms including modifications and variations in the materials used without departing from the true spirit and scope of this invention.

EMBODIMENT EXAMPLE 1

Embodied example 1 is a typical sample that materializes the first exemplary embodiment discussed above. First of all, columnar bodies were made on a negative electrode with the manufacturing apparatus shown in FIG. 5.

Using a band-like electrolytic copper foil having a thickness of 30 μm, convex portions were formed on its surface at 20 μm intervals by the plating method to prepare a current collector. Using silicon (Si) as a negative electrode active material, first columnar bodies and second columnar bodies of homogeneous quality composed of SiOx were made with a deposition unit (i.e., a unit assembled with a deposition source, a crucible pot and an electron beam generator) within a vacuum chamber, an inside of which was filled with oxygen gas of a 99.7% purity through an oxygen nozzle. In this process, the inside of the vacuum chamber was maintained at 3.5 Pa in pressure of oxygen atmosphere. An electron beam generated by the electron beam generator was deflected with a deflection yoke and irradiated to the deposition source. A scrap material produced in the process of making a semiconductor wafer (i.e., scrap silicon of a 99.999% purity) was used for the deposition source.

In this process of forming the first columnar bodies and the second columnar bodies, a tilting angle for the current collector to travel was adjusted to a predetermined degree to obtain an angle $\omega_1$ of 60° on average, and the film-deposition rate set to approximately 8 nm/sec. The first columnar bodies and the second columnar bodies were thus formed.

A tilting angle $\theta_1$ of about 41° was recorded on the columnar body portions of the individual stages when angles of the first columnar bodies and the second columnar bodies were examined with respect to the center line of the current collector by observation of a sectioned surface of the negative electrode with a scanning electron microscope (Model S-4700 made by Hitachi). The first columnar bodies and the second columnar bodies formed here were 30 μm in the thickness (i.e., height) as measured along a direction of the normal.

Distribution of the oxygen was examined by measuring a linear distribution along the sectioned surface of individual stages of columnar body portions composing the columnar bodies of the negative electrode with an electron-beam probe micro-analyzer (referred to hereinafter as "EPMA"), and both the first columnar bodies and the second columnar bodies were found uniform. The measured value of x at this time was 0.6 on average.

The above processes completed the negative electrode provided with the first columnar bodies and the second columnar bodies tilted in a width orientation to the current collector in a symmetrical configuration.

Following the above, a Li metal was deposited to a thickness of 12 μm on a surface of the negative electrode by means of vacuum deposition. An outer side of the negative electrode not confronting the positive electrode is provided with a 30 mm-long exposed area of the copper foil, and a negative electrode lead made of Ni was cut to 58.5 mm in width and welded.

A positive electrode having a positive electrode active material capable of inserting and extracting lithium ions was made next by using the following method.

First, 93 parts by weight of $LiCoO_2$ powder serving as the positive electrode active material and 4 parts by weight of acetylene black serving as a conductive material were mixed. The resultant powder was further mixed with a solution (Catalog No. 1320 manufactured by Kureha Chemical Industry Co., Ltd.) made of poly-vinylidene fluoride (PVDF) dissolved in N-methyl-2-pyrrolidone (NMP), which was used as a binder, so that a weight of PVDF becomes 3 parts by weight. A paste of positive electrode mixture material was then made by adding an appropriate amount of NMP to the above mixture. The paste of positive electrode mixture material was applied to a positive electrode current collector made of an aluminum foil (Al of 15 μm in thickness) by using a doctor blade method, this positive electrode mixture layer was rolled out to obtain a density of 3.5 g/cc and a thickness of 140 μm, and it was thoroughly dried at 85° C. This foil was cut to 57 mm in width and 800 mm in length to prepare the positive electrode. An inner side of the positive electrode not confronting the negative electrode was provided with a 30 mm-long exposed area of the aluminum foil, and a positive electrode lead made of Al was welded thereto.

The negative electrode and the positive electrode prepared in the above steps were wound with a separator made of a 20 μm-thick polypropylene placed therebetween, to complete an electrode group.

The completed electrode group was inserted in a battery case having an open end prepared for a cylindrical battery (made of a Ni-plated steel, 18 mm in diameter and 65 mm in height) with insulation plates placed between the battery case and the electrode group, and the battery was produced by welding the negative electrode lead to the battery case, and the positive electrode lead to a sealing plate. At this time, a distance of 59.2 mm was measured between the insulation plates placed in the top and the bottom portions (i.e., the length available to house the electrode group).

After the produced battery was dried by heating it to 60° C. in a vacuumed atmosphere, it was filled with 5.8 g of an electrolyte consisting of 1.2 mol/$dm^3$ of $LiPF_6$ dissolved in a non-aqueous solvent containing ethylene carbonate (EC), dimethyl carbonate (DMC) and ethyl-methyl carbonate (EMC) in a ratio of 2:3:3 (in volume), and the sealing plate was sealed by crimping it with the battery case to thus complete a non-aqueous electrolyte secondary battery. This battery was designated as sample 1.

EMBODIED EXAMPLE 2

Embodied example 2 is a typical sample that materializes the second exemplary embodiment discussed above. A negative electrode was produced in the same manner as the embodied example 1, except that a value of x of SiOx was varied in the width direction along the tilting orientation of the first columnar bodies and the second columnar bodies.

Measurement of the EPMA at this time showed that the oxygen concentration (i.e., value of x) increases continually in a direction of one side having a tilting angle of $(180-\theta_1)$ from another side of $\theta_1$ along the width direction of the individual columnar bodies. The value of x was in a range of 0.1 to 2 with an average value of 0.6.

A non-aqueous electrolyte secondary battery was produced by using the same method as the embodied example 1 with an exception of employing the above negative electrode, and designated as sample 2.

EMBODIED EXAMPLE 3

Embodied example 3 is a typical sample that materializes the third exemplary embodiment discussed above. A negative electrode was produced in the same manner as the embodied example 1, except that homogeneous first columnar bodies and second columnar bodies composed of SiOx were formed with columnar body portions in three stages, or n=3.

The first columnar bodies and the second columnar bodies were formed at a deposition rate of about 8 nm/s with the angles $\omega_1$ and $\omega_2$ maintained at approximately 60° by adjusting the tilting angle of the current collector being advanced to a predetermined degree. A first stage of columnar body portions (a height of 5 μm, for instance) were formed with the above process. Second and third stages of columnar body portions (a height of 12.5 μm, for instance) were also formed in the same manner to complete the first columnar bodies and the second columnar bodies comprised of the three stages having different tilting angles between the odd-number stages and the even-number stages.

Tilting angles $\theta_1$, $\theta_2$ and $\theta_3$ of about 41° were recorded on the columnar body portions of the individual stages when angles of the individual columnar bodies were examined with respect to the center line of the current collector by observation of a sectioned surface of the negative electrode with a scanning electron microscope (Model S-4700 made by Hitachi). The first columnar bodies and the second columnar bodies formed here were 30 μm in the thickness (i.e., height) as measured along the direction of the normal.

Distribution of the oxygen was examined by measuring a linear distribution along the sectioned surface of individual stages of columnar body portions composing the columnar bodies of the negative electrode with an EPMA, and both the first columnar bodies and the second columnar bodies were found uniform. The measured value of x at this time was 0.6 on average.

The above processes yielded the negative electrode provided with the first columnar bodies and the second columnar bodies tilted in the width orientation to the current collector in a symmetrical configuration.

A non-aqueous electrolyte secondary battery was produced by using the same method as the embodied example 1 with an exception of employing the above negative electrode, and designated as sample 3.

COMPARISON EXAMPLE 1

A negative electrode was produced by using the same method as the embodied example 1 except that the first columnar bodies and the second columnar bodies were formed with their tilting orientation being same as the winding direction of the current collector.

A tilting angle $\theta_1$ of about 41° was recorded on the columnar body portions of the individual stages when angles of the first columnar bodies and the second columnar bodies were examined with respect to the center line of the current collector by observation of a sectioned surface of the negative electrode with a scanning electron microscope (Model S-4700 made by Hitachi). The first columnar bodies and the second columnar bodies formed here were 30 μm in the thickness (i.e., height) as measured along the direction of the normal of the current collector.

Distribution of the oxygen was examined by measuring a linear distribution along the sectioned surface of individual stages of columnar body portions composing the individual columnar bodies of the negative electrode with an EPMA, and both the first columnar bodies and the second columnar bodies were found uniform. The measured value of x at this time was 0.6 on average.

A non-aqueous electrolyte secondary battery was produced by using the same method as the embodied example 1 with an exception of employing the above negative electrode, and designated as sample C1.

COMPARISON EXAMPLE 2

A negative electrode was produced in the same manner as the comparison example 1, except that a value of x of SiOx was varied in the width direction along the tilting orientation of the first columnar bodies and the second columnar bodies.

Measurement of the EPMA at this time showed that the oxygen concentration (i.e., value of x) increases continually in a direction of one side having a tilting angle of $(180-\theta_1)$ from another side of $\theta_1$ along the width direction of the individual columnar bodies. The value of x was in a range of 0.1 to 2 with an average value of 0.6.

A non-aqueous electrolyte secondary battery was produced by using the same method as the comparison example 1 with an exception of employing the above negative electrode, and designated as sample C2.

COMPARISON EXAMPLE 3

A negative electrode was produced in the same manner as the comparison example 1, except that the first columnar bodies and the second columnar bodies were formed with columnar body portions in three stages, or n=3.

A non-aqueous electrolyte secondary battery was produced by using the same method as the comparison example 1 with an exception of employing the above negative electrode, and designated as sample C3.

The individual non-aqueous electrolyte secondary batteries produced as above were evaluated for the following characteristics.

Measurement of Battery Capacity

The individual non-aqueous electrolyte secondary batteries were subjected to an electric charge and discharge under the following conditions in an ambient temperature of 25° C.

First, each of the batteries was charged at a constant voltage until the cell voltage became 4.2V with a constant current of a value corresponding to an hour rate of 0.7 C to the design capacity (2800 mAh), followed by a reduced current value corresponding to an hour rate of 0.05 C with a constant voltage of 4.2V. The batteries were put to a rest thereafter for 30 minutes.

Afterwards, the batteries were discharged until the cell voltage decreases to 2.5V with a constant current of a value corresponding to an hour rate of 0.2 C. Discharge capacities taken here were recorded as battery capacity values.

Evaluation of Short-Circuit Incidence 100 cells each of the non-aqueous electrolyte secondary batteries were subjected to a charge and discharge under the following conditions in an ambient temperature of 25° C.

First, the batteries were charged until the cell voltage became 4.2V with a constant current of a value corresponding to an hour rate of 0.7 C to the design capacity (2800 mAh), followed by a reduced current value corresponding to an hour rate of 0.05 C at a constant voltage of 4.2V. The batteries were then inserted in an environment of 45° C for 7 days.

Any batteries exhibiting a decrease of 50 mV or greater in an open circuit voltage ("OCV") at the end of the insertion were considered as being short-circuited, and a ratio of the incidences was evaluated.

Capacity Retaining Ratio

The individual non-aqueous electrolyte secondary batteries were subjected to repeated cycles of charge and discharge under the following conditions in an ambient temperature of 25° C.

First, each of the batteries was charged until the cell voltage became 4.2V with a constant current of a value corresponding to an hour rate of 0.5 C to the design capacity (2800 mAh), followed by a reduced current value corresponding to an hour rate of 0.05 C at a constant voltage of 4.2V. The batteries were put to a rest thereafter for 30 minutes.

Thereafter, the batteries were discharged until the cell voltage decrease to 2.5V with a constant current of a value corresponding to an hour rate of 0.2 C. The batteries were put to a rest thereafter for 30 minutes.

One complete cycle consisting of the above charge and discharge cycle was repeated 300 times. A ratio of a discharge capacity in the 300th cycle to a discharge capacity in the first cycle expressed in percentage value was recorded as the capacity retaining ratio (%). In other words, a capacity retaining ratio nearer to 100 indicates as being superior in the charge and discharge cycle characteristics.

Table 1 below shows the various parameters and corresponding results of the evaluation on samples 1 to 3 and C1 to C3.

TABLE 1

| | | Parameters | | | | Result of Evaluation | |
| --- | --- | --- | --- | --- | --- | --- | --- |
| | Tilting Orientation | "n" stage | Change in x of SiOx | Tilting Angle (°) | Columnar bodies Thick (μm) | Short circuit Incidence (%) | Capacity Retaining Ratio (%) |
| Sample 1 | Width of Current collector | 1 | No | 41 | 30 | 0 | 63 |
| Sample 2 | Width of Current collector | 1 | Yes | 41 | 30 | 0 | 77 |
| Sample 3 | Width of Current collector | 3 | No | 41 | 30 | 0 | 80 |
| Sample C1 | Winding of Current collector | 1 | No | 41 | 30 | 16 | 60 |

TABLE 1-continued

| | Parameters | | | | Result of Evaluation | |
|---|---|---|---|---|---|---|
| | Tilting Orientation | "n" stage | Change in x of SiOx | Tilting Angle (°) | Columnar bodies Thick (μm) | Short circuit Incidence (%) | Capacity Retaining Ratio (%) |
| Sample C2 | Winding of Current collector | 1 | Yes | 41 | 30 | 7 | 72 |
| Sample C3 | Winding of Current collector | 3 | No | 41 | 30 | 6 | 74 |

Figure 15:
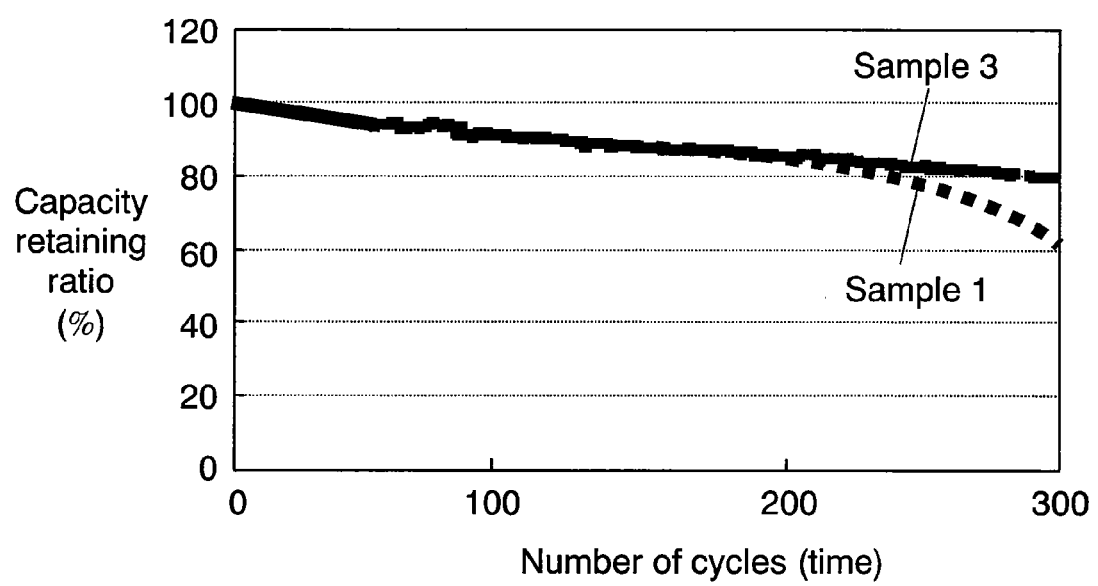
FIG. 15 is a graphic representation showing examples of characteristics of charging and discharging cycles on an embodied sample and a comparison sample.
Figure 16A:
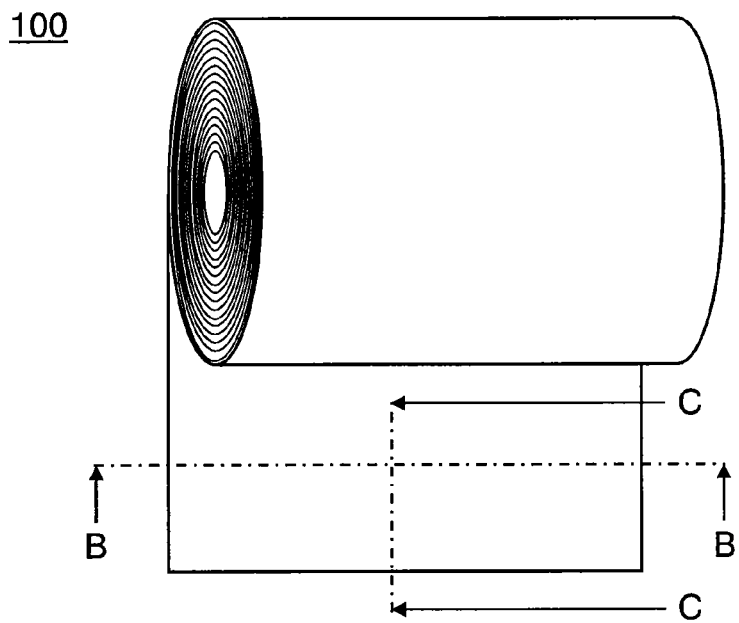
FIG. 16A is a perspective view showing schematically a winding state of only a negative electrode within an electrode group of a conventional non-aqueous electrolyte secondary battery.
Figure 16B:
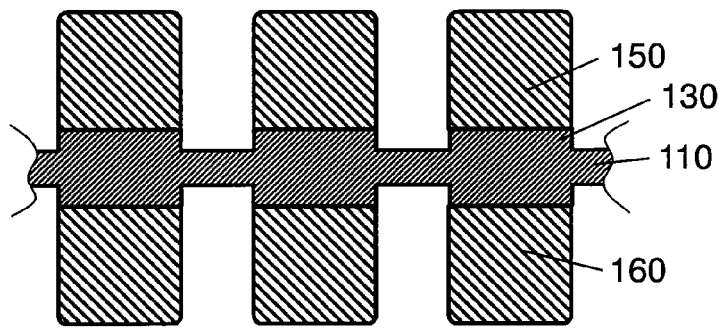
FIG. 16B is a sectional view taken along the line B-B of FIG. 16A.
Figure 16C:
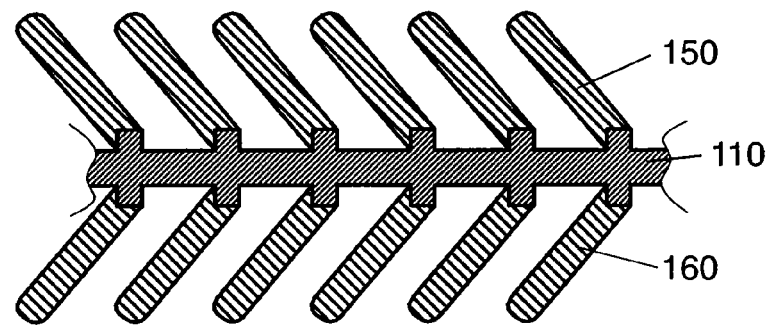
FIG. 16C is a sectional view taken along the line C-C of FIG. 16A.
Figure 17:
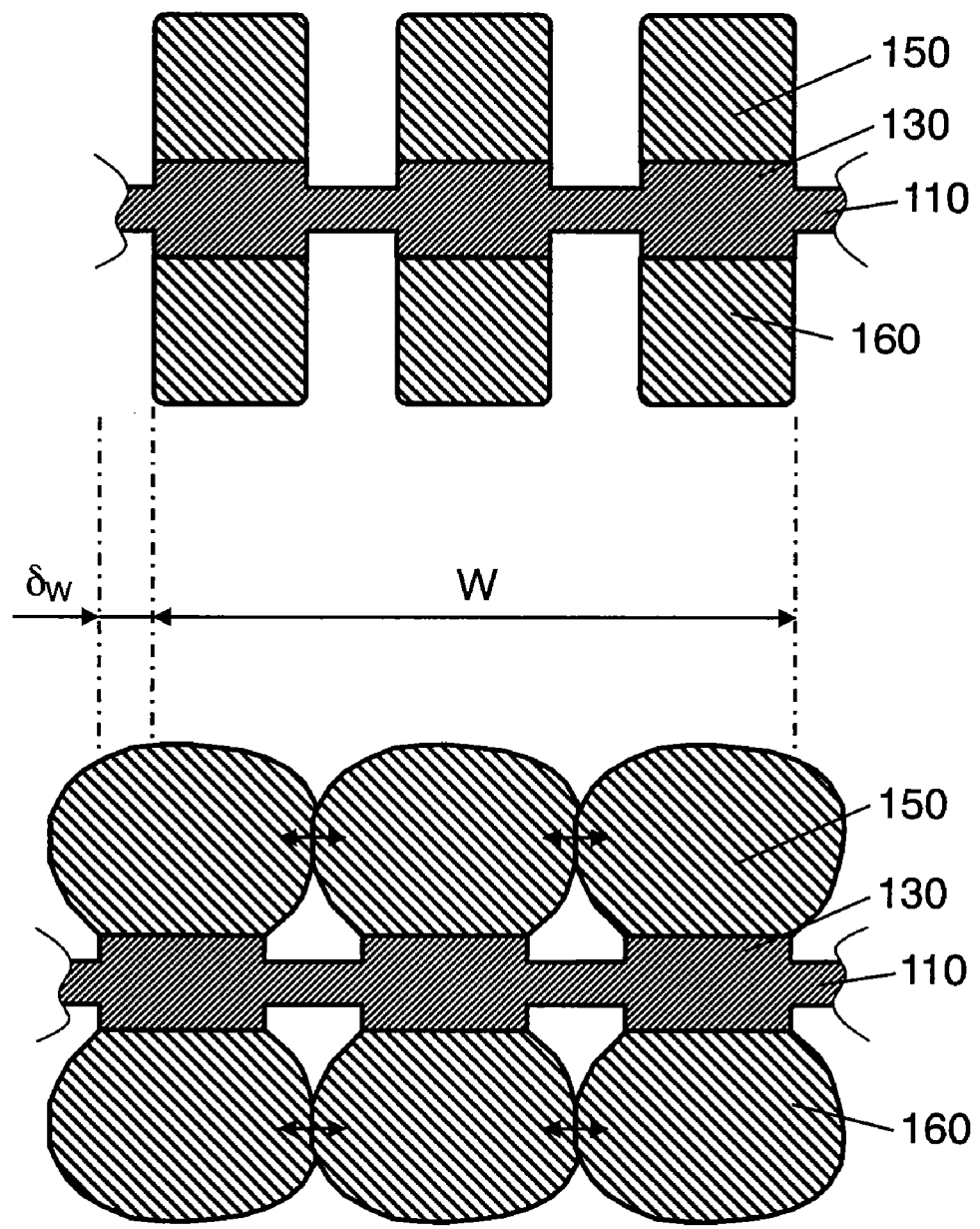
FIG. 17 is schematic views showing configurations of the negative electrode of the conventional non-aqueous electrolyte secondary battery in the states of both before and after it is charged, as observed in a width direction of the current collector.

In addition, FIG. 15 shows the result of evaluation on sample 1 and sample 3, representing typical examples of the cycle characteristics.

It is found from comparison between samples 1 and C1 that sample C1 shows a high incidence of short circuits whereas sample 1 does not, as shown in Table 1. This feature of sample 1 is attributed to less expansion of the current collector in its width direction since the tilting orientation of the columnar bodies is orthogonal to the winding direction, which causes the columnar bodies to come in contact with one another in the same direction as the winding direction when the battery is charged. In the case of sample C1, the columnar bodies come in contact with one another in the direction orthogonal to the winding direction, or the width direction of the electrode group, which causes the current collector to expand. It is therefore considered that this expansion makes the electrode group come to abut against the upper and lower insulation plates, which results in deformation of the electrode group and an electrical contact with the positive electrode. Like results as above were also found on samples 2 and 3 as well as samples C2 and C3.

The incidences of short circuits were relatively smaller on samples C2 and C3, as shown in Table 1. In the case of sample C2, a major reason of this is thought to be the compound SiOx, of which the value of x is varied to cause the columnar bodies to rise during charging, which in turn reduces stresses developed when the adjoining columnar bodies come in contact with one another so as to reduce expansion of the current collector. In the case of sample C3, it is also thought similarly that the columnar bodies formed of the plurality of columnar body portions reduce a deviation in the expanding direction of the columnar bodies, which maintains the void spaces among the columnar bodies and alleviates the stresses, thereby reducing the expansion of the current collector.

Upon comparisons between sample 1 and sample C1, sample 2 and sample C2, and sample 3 and sample C3, there are not significant differences in the capacity retaining ratio after the repeated cycles although they show small improvements with respect to the tilting orientation, the value of x of SiOx, and number of columnar body portion stages of the columnar bodies, as shown in Table 1.

However, when comparisons are made between sample 1 and samples 2 and 3 as well as between sample C1 and samples C2 and C3, there are large differences of approximately 20% in the capacity retaining ratio with samples 1 and C1 being inferior than the other samples. Examination was therefore carried out on the negative electrodes by disassembling the batteries subjected to the evaluation of the cycle characteristics. The examination revealed that a large number of the columnar bodies are separated on samples 1 and C1, of which the columnar bodies are composed of single stage of the columnar body portions. In other words, the decrease of the capacity retaining ratio is considered to be attributed to concentration of the stresses developed by the expansions and contractions during charging and discharging cycles upon the junctions of the columnar bodies with the current collector, which would eventually have caused the separations. On the contrary, there were only few separations of the columnar bodies observed on samples 2 and C2, and samples 3 and C3. This is thought to be attributed to their columnar bodies or the plural stages of the columnar body portions that either rise or reduce mutual contact therebetween, thereby alleviating the stresses on the junctions of the columnar bodies with the current collector. It was the observation through the above that there is not a significant difference in the extent of separations because of small variations locally in degree of the stresses even though the winding direction and the tilting orientation are changed. It is further thought that conditions of the columnar bodies during charges and discharges, their structures, etc. are other factors that could have contributed greatly to these results.

Besides, samples prepared according to the fourth exemplary embodiment exhibited higher values of the capacity retaining ratio by about several percentage points and equivalent results for the incidence of short circuit as compared to sample 3, though they are not especially recorded in Table 1.

According to the above results, it was confirmed that the columnar bodies formed in the tilting orientation along the width direction of the current collector can substantially reduce the incidence of short circuits, and achieve the non-aqueous electrolyte secondary battery of excellent reliability for a long period of time.

What is claimed is:

1. A non-aqueous electrolyte secondary battery comprising:
 a negative electrode having a current collector provided with convex portions and concave portions on both surfaces thereof, a first columnar body formed in a tilting orientation on the convex portion on one of the surfaces of the current collector, and a second columnar body formed in a tilting orientation on the convex portion on the other surface of the current collector;
 a positive electrode having a positive electrode current collector provided on both surfaces thereof with a positive electrode mixture layer containing a positive electrode active material capable of inserting and extracting lithium ions reversibly; and
 a separator interposed between the positive electrode and the negative electrode in a confronting manner,
 wherein the first columnar body and the second columnar body on the negative electrode are tilted to a direction orthogonal to a winding direction of the current collector.

2. The non-aqueous electrolyte secondary battery of claim 1, wherein the first columnar body and the second columnar body have a structure comprising n-stages (where n≧2) of columnar body portions overlaid one another; and the columnar body portions of an odd-number stage and an even-number stage are tilted to different orientations.

3. The non-aqueous electrolyte secondary battery of claim 1, wherein a content ratio of an element composing the first columnar body and the second columnar body is varied in a width direction along a tilting orientation.

4. The non-aqueous electrolyte secondary battery of claim 2, wherein a content ratio of an element composing the columnar body portions is varied in a width direction along a tilting orientation, and directions of the variation are different between the odd-number stage and the even-number stage of the columnar body portions.

5. The non-aqueous electrolyte secondary battery of claim 3, wherein an acute side angle formed at an intersection between a center line in the tilting orientation of the first and the second columnar bodies and a center line in the direction of thickness of the current collector becomes greater at least during a charging state than during a discharging state.

6. The non-aqueous electrolyte secondary battery of claim 4, wherein an acute side angle formed at an intersection between a center line in the tilting orientation of the columnar body portion and a center line in the direction of thickness of the current collector becomes greater at least during a charging state than during a discharging state.

7. The non-aqueous electrolyte secondary battery of claim 1, wherein the first columnar body and the second columnar body include a negative electrode active material having at least a property of reversibly inserting and extracting lithium ions and a theoretical capacity density exceeding 833 mAh/cm$^3$.

8. The non-aqueous electrolyte secondary battery of claim 7, wherein the negative electrode active material includes a material containing at least silicon, as expressed by the formula of SiOx.

9. The non-aqueous electrolyte secondary battery of claim 8, wherein a value of x of the material expressed by the formula of SiOx containing silicon is increased continually from one side forming an acute angle at an intersection between a center line in the tilting orientation of the first and the second columnar bodies and a center line in the direction of thickness of the current collector toward another side forming an obtuse angle.

* * * * *